(12) United States Patent
Matsui et al.

(10) Patent No.: US 12,487,021 B2
(45) Date of Patent: Dec. 2, 2025

(54) TEMPERATURE ADJUSTMENT APPARATUS AND STORAGE

(71) Applicant: DAIKIN INDUSTRIES, LTD., Osaka (JP)

(72) Inventors: Hidenori Matsui, Osaka (JP); Kiichiro Sato, Osaka (JP); Toshiaki Mukaidani, Osaka (JP)

(73) Assignee: DAIKIN INDUSTRIES, LTD., Osaka (JP)

( * ) Notice: Subject to any disclaimer, the term of this patent is extended or adjusted under 35 U.S.C. 154(b) by 155 days.

(21) Appl. No.: 18/550,019

(22) PCT Filed: Mar. 18, 2022

(86) PCT No.: PCT/JP2022/012834
§ 371 (c)(1),
(2) Date: Sep. 11, 2023

(87) PCT Pub. No.: WO2022/210050
PCT Pub. Date: Oct. 6, 2022

(65) Prior Publication Data
US 2024/0167750 A1 May 23, 2024

(30) Foreign Application Priority Data
Mar. 31, 2021 (JP) .................. 2021-059438

(51) Int. Cl.
*F25D 17/04* (2006.01)
*F25D 11/00* (2006.01)
(Continued)

(52) U.S. Cl.
CPC .......... *F25D 17/045* (2013.01); *F25D 11/003* (2013.01); *F25D 21/04* (2013.01); *F25D 23/069* (2013.01)

(58) Field of Classification Search
CPC ...... F25D 17/045; F25D 11/003; F25D 21/04; F25D 23/069; F25D 11/022;
(Continued)

(56) References Cited

U.S. PATENT DOCUMENTS 5,129,235 A * 7/1992 Renken .................... F25D 19/04
454/91
5,161,848 A * 11/1992 Lutton .................... B60P 3/205
296/181.6
(Continued)

FOREIGN PATENT DOCUMENTS

CN 107289701 A * 10/2017
JP 2000-108677 4/2000
(Continued)

OTHER PUBLICATIONS

CN-107289701-A Translation (Year: 2017).*
(Continued)

*Primary Examiner* — David J Teitelbaum
(74) *Attorney, Agent, or Firm* — IPUSA, PLLC

(57) ABSTRACT

A temperature adjustment apparatus configured to transfer heat in a first storage chamber to a second storage chamber, and adjust the first storage chamber and the second storage chamber to different temperatures is provided. The temperature adjustment apparatus includes a control unit configured to perform control in a first driving mode of causing heat to be exchanged between the first storage chamber and the second storage chamber without flowing air therebetween. For example, the control unit further performs control in a second driving mode of causing heat to be exchanged between the first storage chamber and the second storage chamber by flowing air therebetween. For example, the control unit performs control in the second driving mode in response to a rise in the concentration of carbon dioxide or ethylene in the first storage chamber or the second storage chamber.

7 Claims, 23 Drawing Sheets

(51) Int. Cl.
*F25D 21/04* (2006.01)
*F25D 23/06* (2006.01)

(58) Field of Classification Search
CPC ............ B60H 1/00014; B60H 1/00364; B60H 1/00371; B60H 1/00564
See application file for complete search history.

(56) References Cited

U.S. PATENT DOCUMENTS

| | | | |
|---|---|---|---|
| 6,238,282 B1 * | 5/2001 | Kindel | B61D 17/18 454/84 |
| 2016/0348955 A1 * | 12/2016 | Ren | F25D 17/065 |
| 2019/0234677 A1 | 8/2019 | Tippmann | |

FOREIGN PATENT DOCUMENTS

| | | |
|---|---|---|
| JP | 2006-057947 | 3/2006 |
| JP | 2016-145688 | 8/2016 |
| KR | 10-2007-0015940 | 2/2007 |

OTHER PUBLICATIONS

International Search Report for PCT/JP2022/012834 mailed on May 31, 2022.
International Preliminary Report on Patentability for PCT/JP2022/012834 mailed on Oct. 12, 2023.
Extended European search report mailed on Mar. 13, 2025 with respect to the corresponding European application No. 22780265.9.

* cited by examiner

TEMPERATURE ADJUSTMENT APPARATUS AND STORAGE

TECHNICAL FIELD

The present disclosure relates to a temperature adjustment apparatus and a storage.

BACKGROUND ART

A known technique for a packing box in which a sectioned space ahead of a partition wall is used as a freezing chamber and a sectioned space behind the partition wall is used as a refrigeration chamber performs temperature control by circulating air between the freezing chamber and the refrigeration chamber and sending cold air from the freezing chamber to the refrigeration chamber (for example, see PTL 1).

CITATION LIST

Patent Literature

[PTL 1] Japanese Patent Application Publication No. 2000-108677

SUMMARY OF INVENTION

Technical Problem

However, when air is circulated between a storage chamber at a lower temperature and a storage chamber at a higher chamber, dew condensation may appear in the storage chamber at the lower temperature.

The present disclosure provides a temperature adjustment apparatus that can inhibit dew condensation in a storage chamber that is at the lower temperature of storage chambers adjusted to different temperatures, and a storage.

Solution to Problem

The present disclosure provides a temperature adjustment apparatus configured to transfer heat in a first storage chamber to a second storage chamber, and adjust the first storage chamber and the second storage chamber to different temperatures, the temperature adjustment apparatus including:
  a control unit configured to perform control in a first driving mode of causing heat to be exchanged between the first storage chamber and the second storage chamber without flowing air therebetween.

Hence, because heat is exchanged between the first storage chamber and the second storage chamber without flowing of air therebetween, it is possible to inhibit dew condensation in the storage chamber that is at the lower temperature of the first storage chamber and the second storage chamber.

In the temperature adjustment apparatus, the control unit may further perform control in a second driving mode of causing heat to be exchanged between the first storage chamber and the second storage chamber by flowing air therebetween.

Hence, it is possible to rapidly cool the storage chamber that is at the higher temperature of the first storage chamber and the second storage chamber.

In the temperature adjustment apparatus, the control unit may perform control in the second driving mode in response to a rise in a concentration of carbon dioxide or ethylene in the first storage chamber or the second storage chamber.

Hence, it is possible to reduce the concentration of carbon dioxide or ethylene in the storage chamber, in which the concentration has risen, of the first storage chamber and the second storage chamber.

In the temperature adjustment apparatus, the control unit may further perform control in a third driving mode of flowing air between the first storage chamber and the second storage chamber while inhibiting transfer of heat therebetween.

Hence, it is possible to circulate air between the first storage chamber and the second storage chamber while inhibiting temperature changes in each of the first storage chamber and the second storage chamber.

The present disclosure provides a storage including:
  the temperature adjustment apparatus described above;
  the first storage chamber in which an article is stored; and
  the second storage chamber in which an article is stored.

Hence, it is possible to provide a storage including the first storage chamber and the second storage chamber, in which dew condensation can be inhibited in whichever of the storage chambers is at a lower temperature.

In the storage, the first storage chamber may be for freezing, and the second storage chamber may be for refrigeration.

Hence, it is possible to inhibit dew condensation in the first storage chamber that is for freezing.

The storage may further include an air composition adjustment apparatus configured to adjust a composition of air in the first storage chamber or the second storage chamber.

Hence, it is possible to adjust the composition of air in the first storage chamber or the second storage chamber.

In the storage, the temperature adjustment apparatus may be driven in the first driving mode when the air composition adjustment apparatus is adjusting the composition of air in the second storage chamber.

Hence, it is possible to inhibit an error from occurring in the adjustment of the composition of air in the second storage chamber due to air being flowed into the second storage chamber from the first storage chamber.

The storage includes a venting passage provided in a wall partitioning the first storage chamber and the second storage chamber.

Air that is in a T-rail portion, a drainboard portion, or a pallet portion on a storage bottom portion, and air that is in a storage upper portion above a load line may circulate into each other through the venting passage.

Hence, it is possible to circulate air that is in a T-rail portion, a drainboard portion, or a pallet portion on a storage bottom portion and air that is in a storage upper portion above a load line into each other.

DESCRIPTION OF EMBODIMENTS

Embodiments will be described below.

First Embodiment

Figure 1:
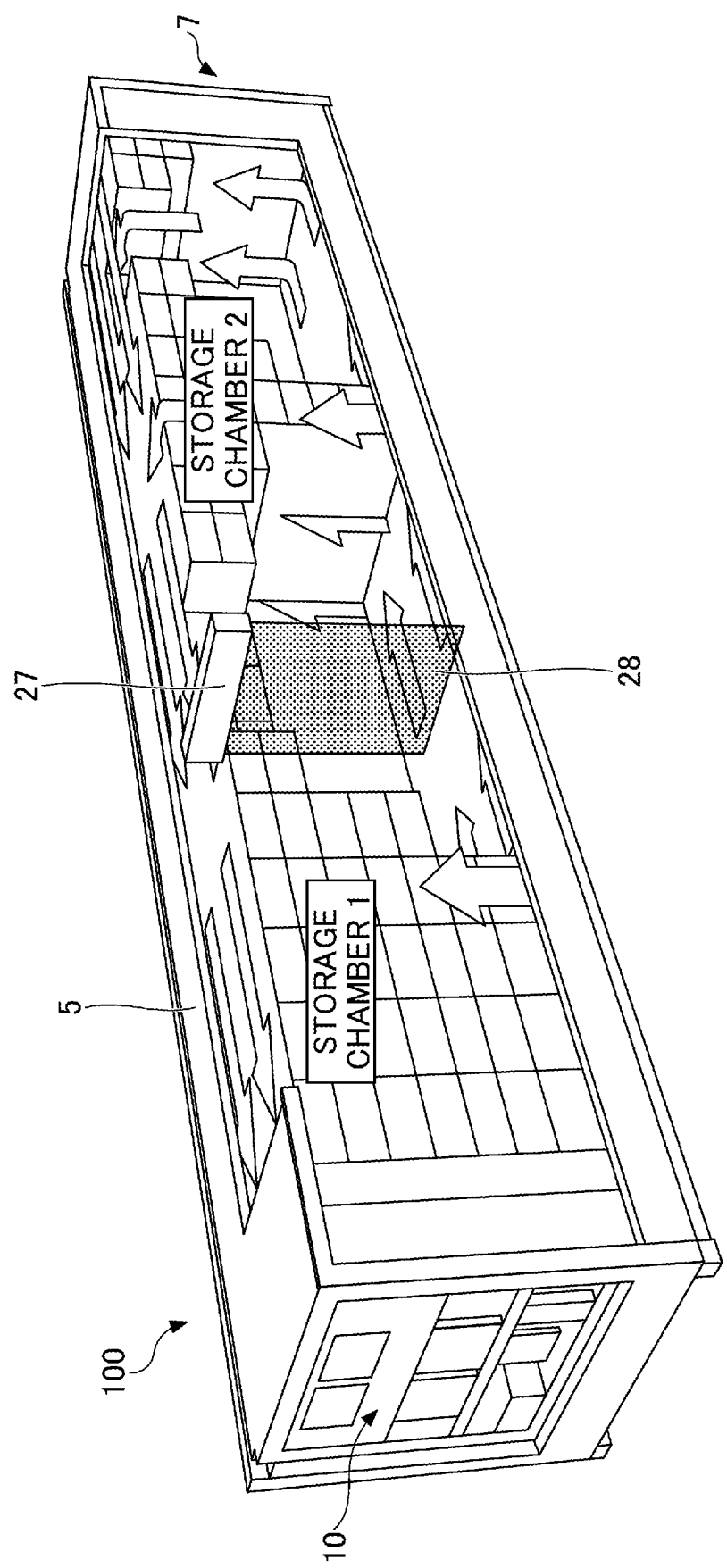
FIG. 1 is an oblique appearance view illustrating an example of a storage according to a first embodiment by omitting some parts.

FIG. 1 is an oblique appearance view illustrating an example of a storage according to a first embodiment by omitting some parts. A storage 100 illustrated in FIG. 1 is a cooling box including a movable container 5 in which articles such as fresh food, chemical products, and medicine are contained, and a freezing apparatus 10 configured to adjust the temperature in a storage interior space of the container 5. The storage 100 can be applied to a reefer container used for, for example, land transportation and marine transportation.

The container 5 is a movable container used for, for example, land transportation and marine transportation. The container 5 has a rectangular-parallelepiped-shaped box shape, of which one end in the longer direction is open. The one end of the container 5 is closed by the freezing apparatus 10. A let-in/let-out opening through which a load to be stored or a load stored in the storage interior space is carried into or carried out from is formed at the other end of the container 5. The let-in/let-out opening is closed by an openable/closable door 7.

The freezing apparatus 10 is a freezer configured to cool the interior of the container 5 that is used for, for example, land transportation or marine transportation. The freezing apparatus 10 includes a refrigerant circuit configured to perform a freezing cycle operation. The refrigerant circuit includes a compressor, a radiator, an expansion valve, and an evaporator. The freezing apparatus 10 is attached on the one end of the container 5 and closes the one end.

Figure 2:
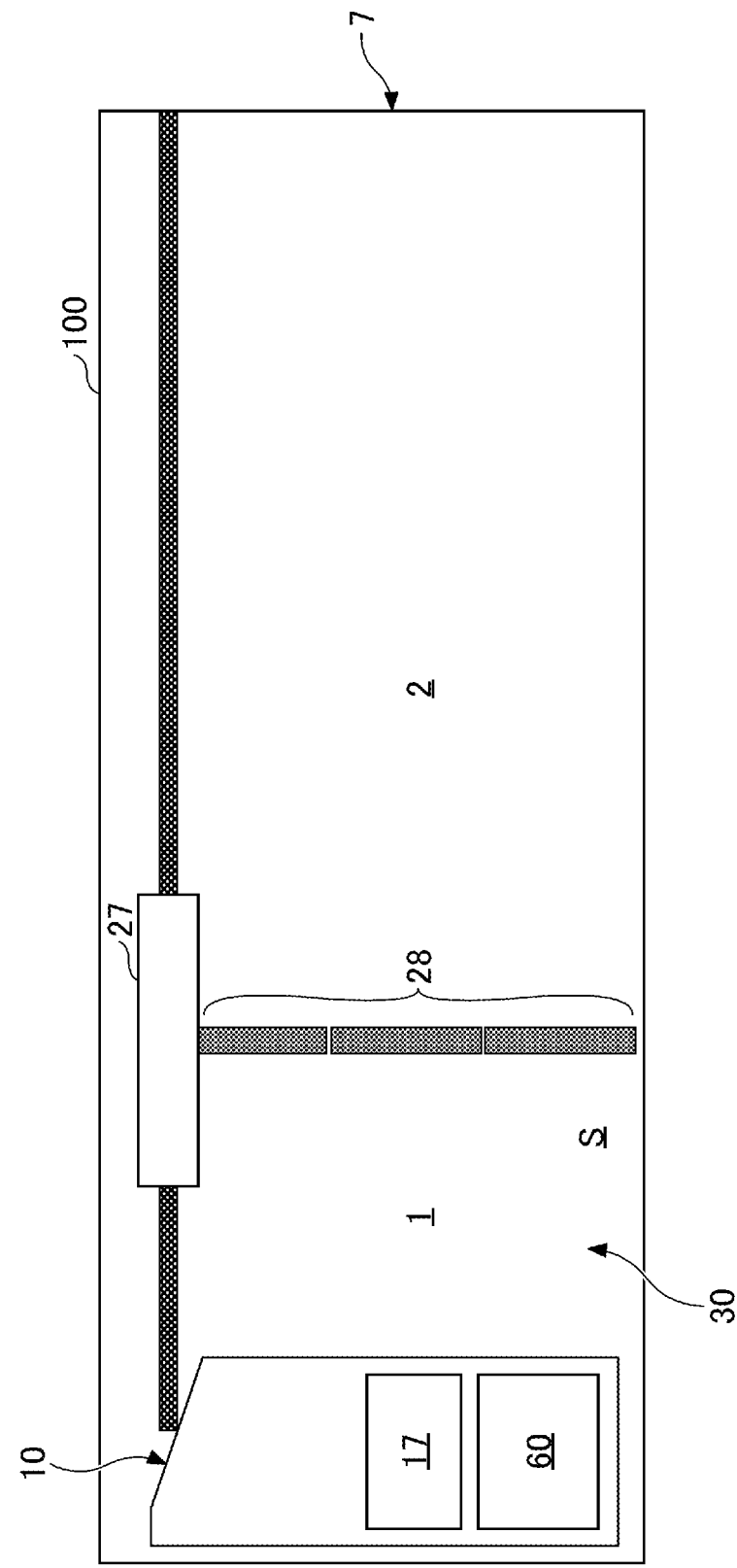
FIG. 2 is a cross-sectional side view illustrating the example of the storage according to the first embodiment by omitting some parts.

FIG. 2 is a cross-sectional side view illustrating an example of the storage according to the first embodiment by omitting some parts. The storage 100 includes a controller 17, the freezing apparatus 10, a storage chamber 30, a partition wall 28, the freezing apparatus 10, and a temperature adjustment apparatus 27.

The controller 17 is configured to control each component of the storage 100 based on a driving instruction or a detection signal from a sensor. The controller 17 is an example of a control unit configured to control driving of, for example, the freezing apparatus 10 and the temperature adjustment apparatus 27. The controller 17 is a control apparatus including a processor and a memory. Functions of the controller 17 are realized by operating of the processor such as a Central Processing Unit (CPU) in accordance with a program stored in the memory. Functions of the controller 17 may be realized by a Field Programmable Gate Array (FPGA) or an Application Specific Integrated Circuit (ASIC).

The storage chamber 30 has a storage interior space S in which articles are stored. The partition wall 28 is an example of a partition provided movably in a direction along an internal wall of the storage chamber 30 and configured to partition the storage chamber 30 into a plurality of rooms. FIG. 2 illustrates a state in which the storage chamber 30 is partitioned by the partition wall 28 into two storage chambers 1 and 2. The temperature adjustment apparatus 27 is configured to adjust the plurality of storage chambers 1 and 2 partitioned by the partition wall 28 to different temperatures. The storage 100 having this configuration can have different temperature environments in the respective rooms (storage chambers) partitioned by the partition wall 28.

For example, the storage chamber 1 is a storage chamber for freezing, and the storage chamber 2 is a storage chamber for refrigeration.

The freezing apparatus 10 adjusts the refrigeration temperature or the freezing temperature in the storage chamber 1 in accordance with an operation instruction from the controller 17.

The temperature adjustment apparatus 27 adjusts a rate of air flow between the plurality of storage chambers 1 and 2 partitioned by the partition wall 28, or causes heat to be exchanged therebetween in accordance with an operation instruction from the controller 17. Of the temperatures set in the storage chambers by the temperature adjustment apparatus 27, the temperature in any of the storage chambers 1 and 2 may be higher than the temperature in the other. However, it is preferable that the temperature set in the storage chamber 2 is higher than the temperature set in the storage chamber 1, because heat in the storage chamber 2 can easily escape to outside the storage 100 by an opening operation of the openable/closable door 7.

In the example illustrated in FIG. 2, the storage chamber 1 in which a cooling operation is performed is present between the freezing apparatus 10 and the storage chamber 2 that is for refrigeration or freshness keeping. This makes it easy for a refrigeration/freezing function of the freezing apparatus 10 to be used for the cooling operation in the storage chamber 1.

As illustrated in FIG. 2, the temperature adjustment apparatus 27 may extend over the plurality of storage chambers 1 and 2 in a state that the partition wall 28 is partitioning the storage chamber 30 into the plurality of storage chambers 1 and 2. This makes it easy to form different temperature environments in the respective storage chambers partitioned by the partition wall 28. For example, it is easy for the temperature adjustment apparatus 27 to adjust the rate of air flow between the plurality of rooms, or cause heat to be exchanged therebetween.

The temperature adjustment apparatus 27 transfers heat in the storage chamber 1 into the storage chamber 2 and adjusts the storage chamber 1 and the storage chamber 2 to different temperatures. The storage chamber is an example of a first storage chamber, and the storage chamber 2 is an example of a second storage chamber.

Figure 3:
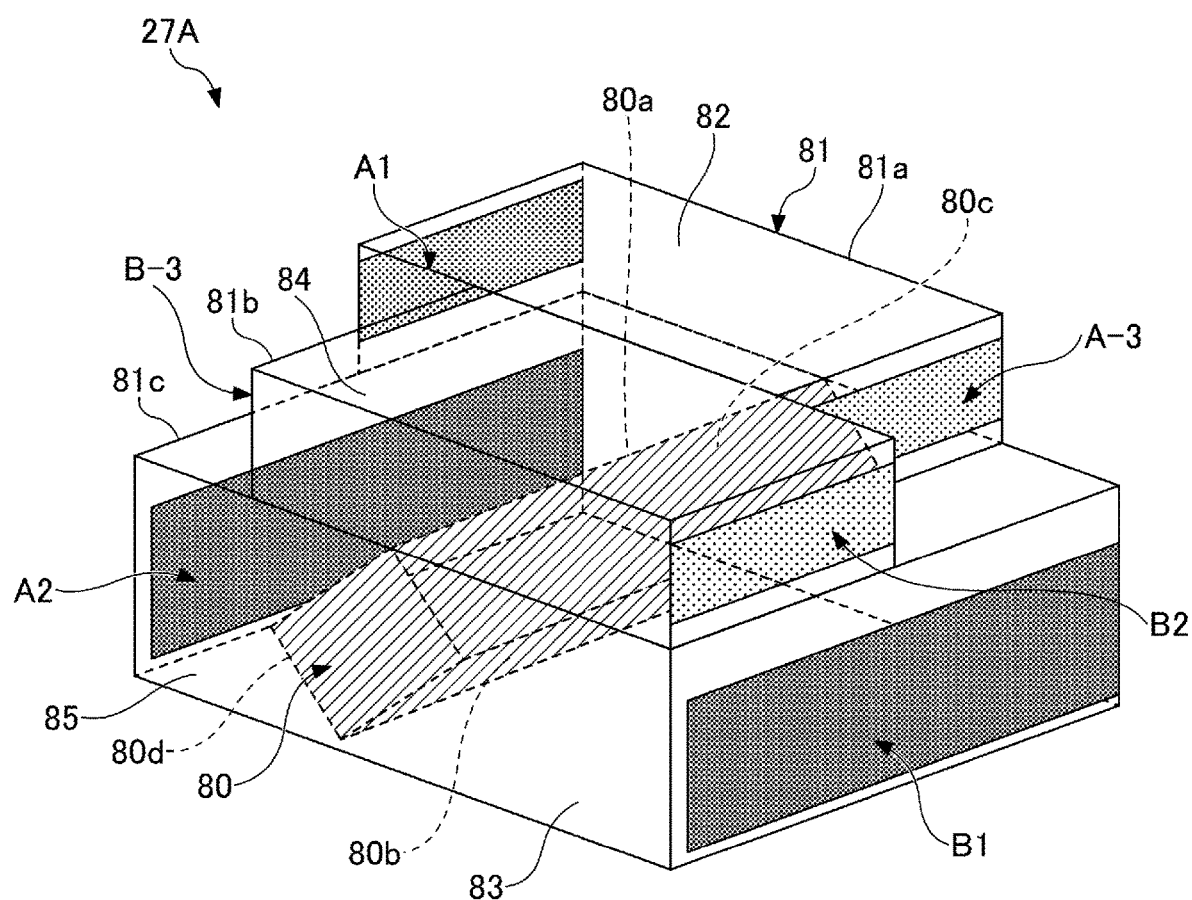
FIG. 3 is an oblique view illustrating a first configuration example of a temperature adjustment apparatus.

FIG. 3 is an oblique view illustrating a first configuration example of the temperature adjustment apparatus. A temperature adjustment apparatus 27A is an example of the temperature adjustment apparatus 27 described above. The temperature adjustment apparatus 27A includes a casing 81 in which a heat exchange element 80 is contained. An opening A1, an opening B1, an opening B2, an opening A2, an openable/closable window A-3, and an openable/closable window B-3 are provided in the surfaces of the casing 81.

The casing 81 includes a plurality of approximately rectangular parallelepiped-shaped casing portions 81*a*, 81*b*, and 81*c*. Each of the casing portions 81*a*, 81*b*, and 81*c* may share their dividing walls with adjoining casing portions. The opening A1 and the openable/closable window A-3 are provided in a pair of facing surfaces of the casing portion 81*a*. The opening B2 and the openable/closable window B-3 are provided in a pair of facing surfaces of the casing portion 81*b*. The opening B1 and the opening A2 are provided in a pair of facing surfaces of the casing portion 81*c*. The casing portions 81*a* and 81*b* are provided on top of the casing portion 81*c*. The opening B2 and the openable/closable window B-3 of the casing portion 81*b* are offset from the head-on positions with respect to the casing portion 81*a*.

The opening A1, the opening A2, and the openable/closable window B-3 are coupled to the storage chamber 1, and the opening B2, the opening B1, and the openable/closable window A-3 are coupled to the storage chamber 2. An internal chamber 82, an internal chamber 83, an internal chamber 84, and an internal chamber 85 are formed in the internal space of the casing 81. The internal chamber 82, the internal chamber 83, the internal chamber 84, and the internal chamber 85 are partitioned from adjoining chambers by partition walls.

One end of the internal chamber 82 is coupled to the opening A1, and the other end thereof is coupled to the openable/closable window A-3. One end of the internal chamber 83 is coupled to an element surface 80*b* of the heat exchange element 80, and the other end thereof is coupled to the opening B1. One end of the internal chamber 84 is coupled to the opening B2, and the other end thereof is coupled to the openable/closable window B-3. One end of the internal chamber 85 is coupled to an element surface 80*d* of the heat exchange element 80, and the other end thereof is coupled to the opening A2.

The heat exchange element 80 is a rectangular parallelepiped-shaped heat exchanger having element surfaces 80*a* and 80*b* facing each other, and element surfaces 80*c* and 80*d* facing each other. The heat exchange element 80 includes a first flow path that connects the element surface 80*a* and the element surface 80*b*, and a second flow path that connects the element surface 80*c* and the element surface 80*d*. The first flow path and the second flow path intersect each other. The heat exchange element 80 is configured to cause heat to be exchanged between air that flows through the first flow path and air that flows through the second flow path.

Figure 4:
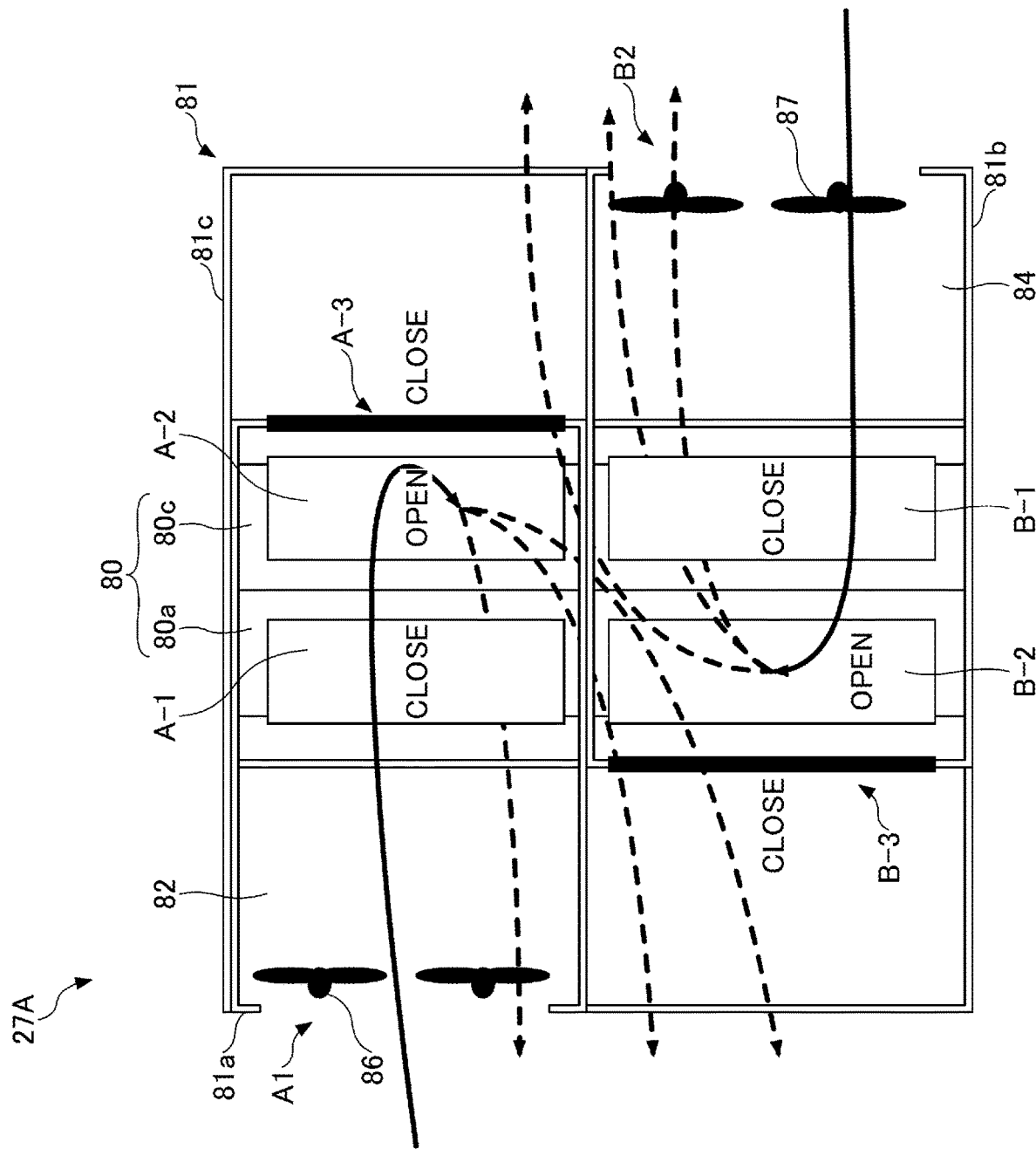
FIG. 4 is a cross-sectional top view illustrating an operating state of the first configuration example of the temperature adjustment apparatus in a first driving mode.
Figure 5:
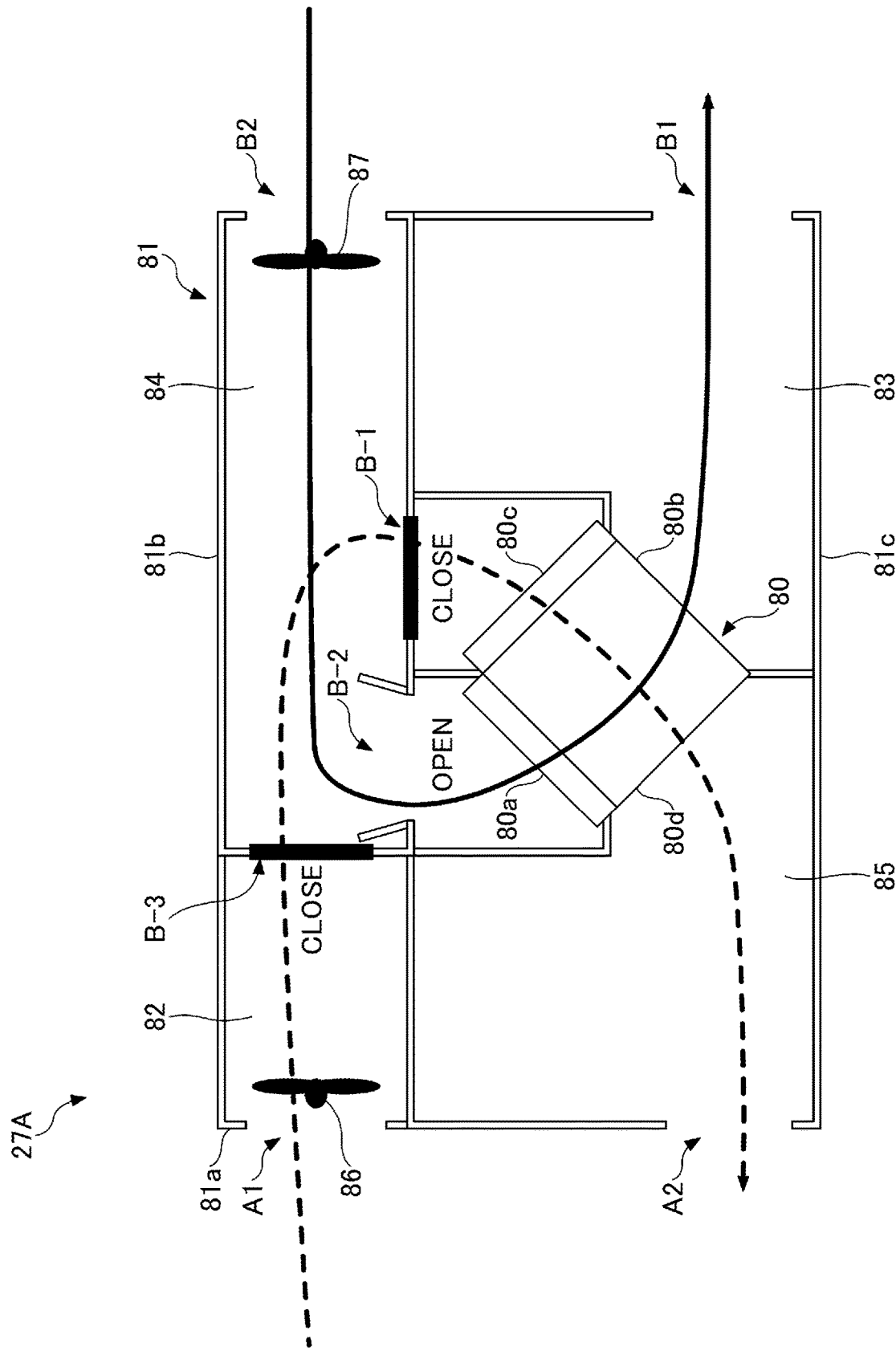
FIG. 5 is a cross-sectional side view illustrating the operating state of the first configuration example of the temperature adjustment apparatus in the first driving mode.

FIG. 4 is a cross-sectional top view illustrating an operating state of the first configuration example of the temperature adjustment apparatus in a first driving mode. FIG. 5 is a cross-sectional side view illustrating the operating state of the first configuration example of the temperature adjustment apparatus in the first driving mode. An air blower 86 situated in the internal chamber 82 is configured to suction air in the storage chamber 1 into the internal chamber 82 through the opening A1. An air blower 87 situated in the internal chamber 84 is configured to suction air in the storage chamber 2 into the internal chamber 84 through the opening B2. In the first configuration example, the openings A1 and B2 are used as air suction openings, the openings A2 and B1 are used as blowout openings, the internal chambers 82 and 84 are used as air suction chambers, and the internal chambers 83 and 85 are used as blowout chambers.

Flowing and shut-off of air between the internal chamber 82 and the element surface 80*a* are controlled by opening or closing of an openable/closable window A-1. Flowing and shut-off of air between the internal chamber 82 and the element surface 80*c* are controlled by opening or closing of an openable/closable window A-2. Flowing and shut-off of air between the internal chamber 84 and the element surface 80*c* are controlled by opening or closing of an openable/closable window B-1. Flowing and shut-off between the internal chamber 84 and the element surface 80*a* are controlled by opening or closing of an openable/closable window B-2.

The controller 17 controls the temperature adjustment apparatus 27A in the first driving mode of causing heat to be exchanged between the storage chamber 1 and the storage chamber 2 without flowing air therebetween. In the first driving mode, the controller 17 actuates the air blowers 86 and 87, closes the openable/closable windows A-1, B-1, A-3, and B-3, and opens the openable/closable windows A-2 and B-2. Hence, air from the storage chamber 1 is returned into the storage chamber 1 through a route of from the opening A1 to the internal chamber 82, to the openable/closable window A-2, to the element surface 80*c*, to the element surface 80*d*, to the internal chamber 85, and to the opening A2. On the other hand, air from the storage chamber 2 is returned into the storage chamber 2 through a route of from the opening B2 to the internal chamber 84, to the openable/closable window B-2, to the element surface 80*a*, to the element surface 80*b*, to the internal chamber 83, and to the opening B1. Hence, because heat is exchanged between the storage chamber 1 and the storage chamber 2 without flowing of air therebetween, it is possible to inhibit dew condensation in the storage chamber 1 that is at the lower temperature of the storage chamber 1 and the storage chamber 2.

Figure 6:
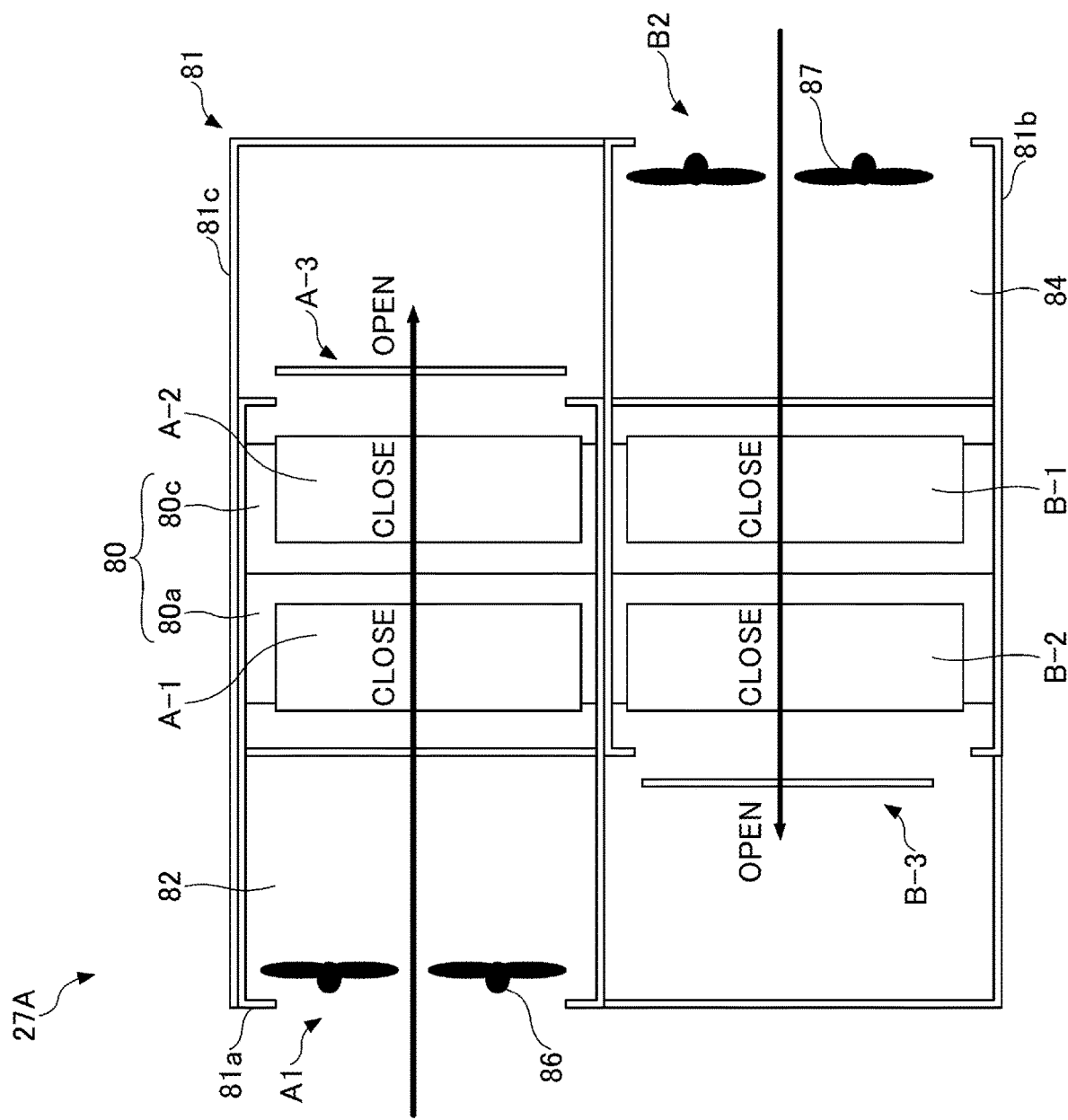
FIG. 6 is a cross-sectional top view illustrating an operating state of the first configuration example of the temperature adjustment apparatus in a second driving mode.
Figure 7:
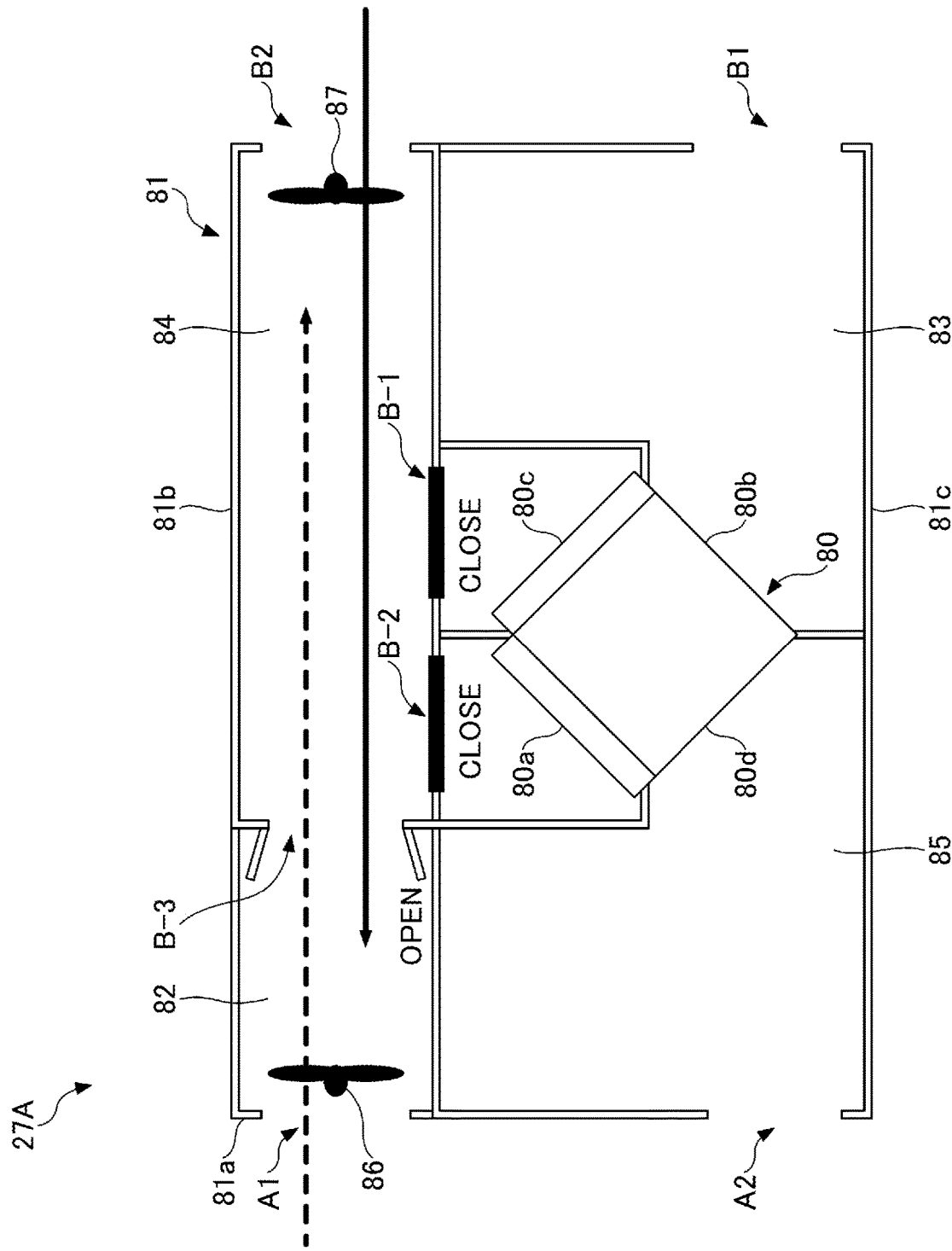
FIG. 7 is a cross-sectional side view illustrating the operating state of the first configuration example of the temperature adjustment apparatus in the second driving mode.

FIG. 6 is a cross-sectional top view illustrating an operating state of the first configuration example of the temperature adjustment apparatus in a second driving mode. FIG. 7 is a cross-sectional side view illustrating the operating state of the first configuration example of the temperature adjustment apparatus in the second driving mode.

The controller 17 controls the temperature adjustment apparatus 27A in the second driving mode of causing heat to be exchanged between the storage chamber 1 and the storage chamber 2 by flowing air therebetween. In the second driving mode, the controller 17 actuates the air blowers 86 and 87, closes the openable/closable windows A-1, A-2, B-1, and B-2, and opens the openable/closable windows A-3 and B-3. Hence, air from the storage chamber 1 is supplied into the storage chamber 2 through a route of from the opening A1, to the internal chamber 82, and to the openable/closable window A-3. On the other hand, air from the storage chamber 2 is supplied into the storage chamber 1 through a route of from the opening B2, to the internal chamber 84, and to the openable/closable window B-3. By this control, it is possible to cause heat to be exchanged between the storage chamber 1 and the storage chamber 2 by flowing air therebetween by making air bypass the heat exchange element 80. This makes it possible for the storage chamber 2, which is at the higher temperature of the storage chamber 1 and the storage chamber 2, to be directly supplied with air in the storage chamber 1, which is at the lower temperature, making it possible to rapidly cool the storage chamber 2.

For example, in response to a rise in the concentration of carbon dioxide or ethylene in the storage chamber 1 or the storage chamber 2, the controller 17 controls the temperature adjustment apparatus 27A in the second driving mode. This makes it possible to reduce the concentration of carbon dioxide or ethylene in the storage chamber, in which the concentration has risen, of the storage chamber 1 and the storage chamber 2. Hence, it is possible to minimize trouble due to a rise in the concentration of carbon dioxide, or excessive aging of fresh food due to a rise in the concentration of ethylene.

Figure 8:
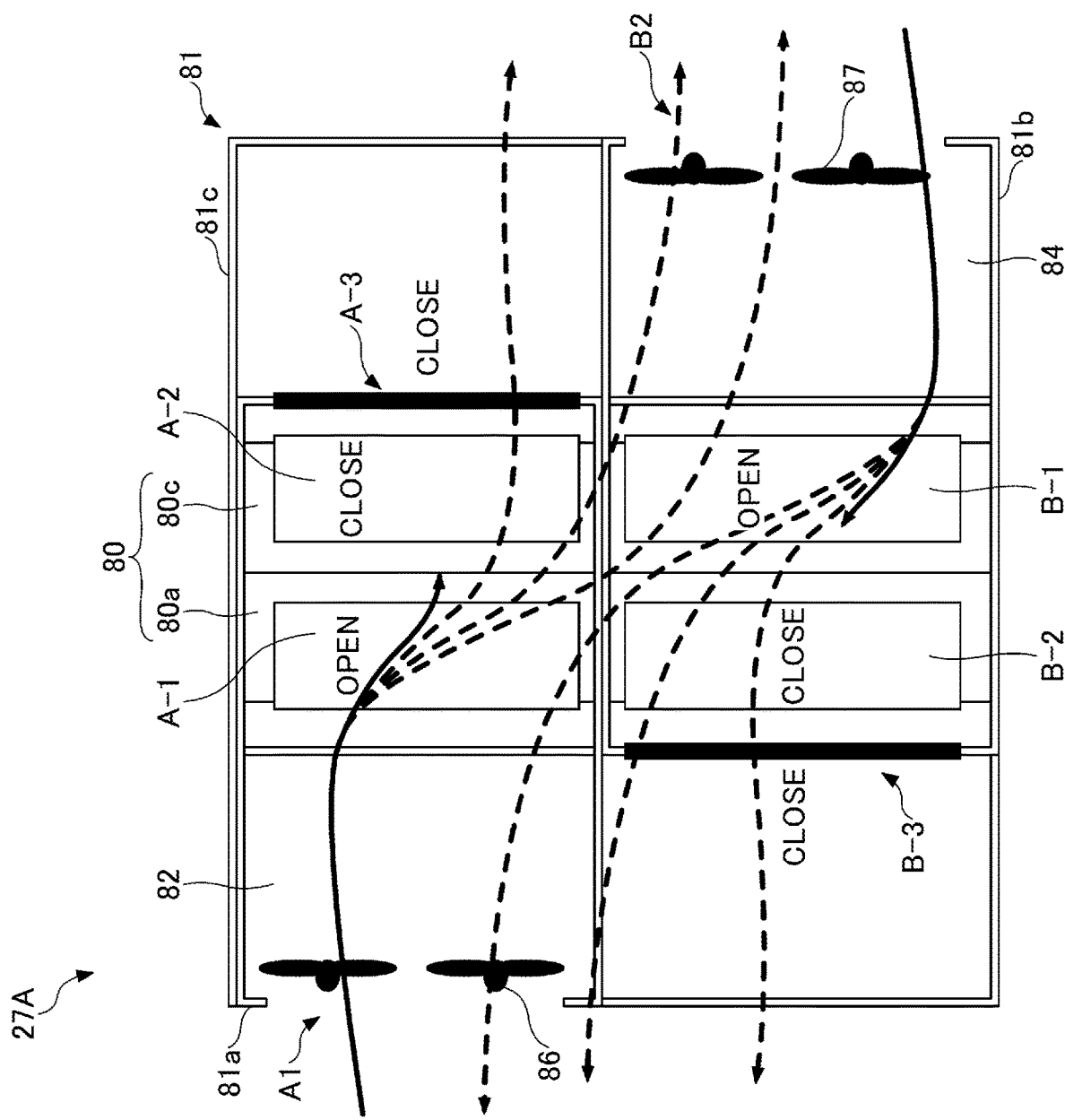
FIG. 8 is a cross-sectional top view illustrating an operating state of the first configuration example of the temperature adjustment apparatus in a third driving mode.
Figure 9:
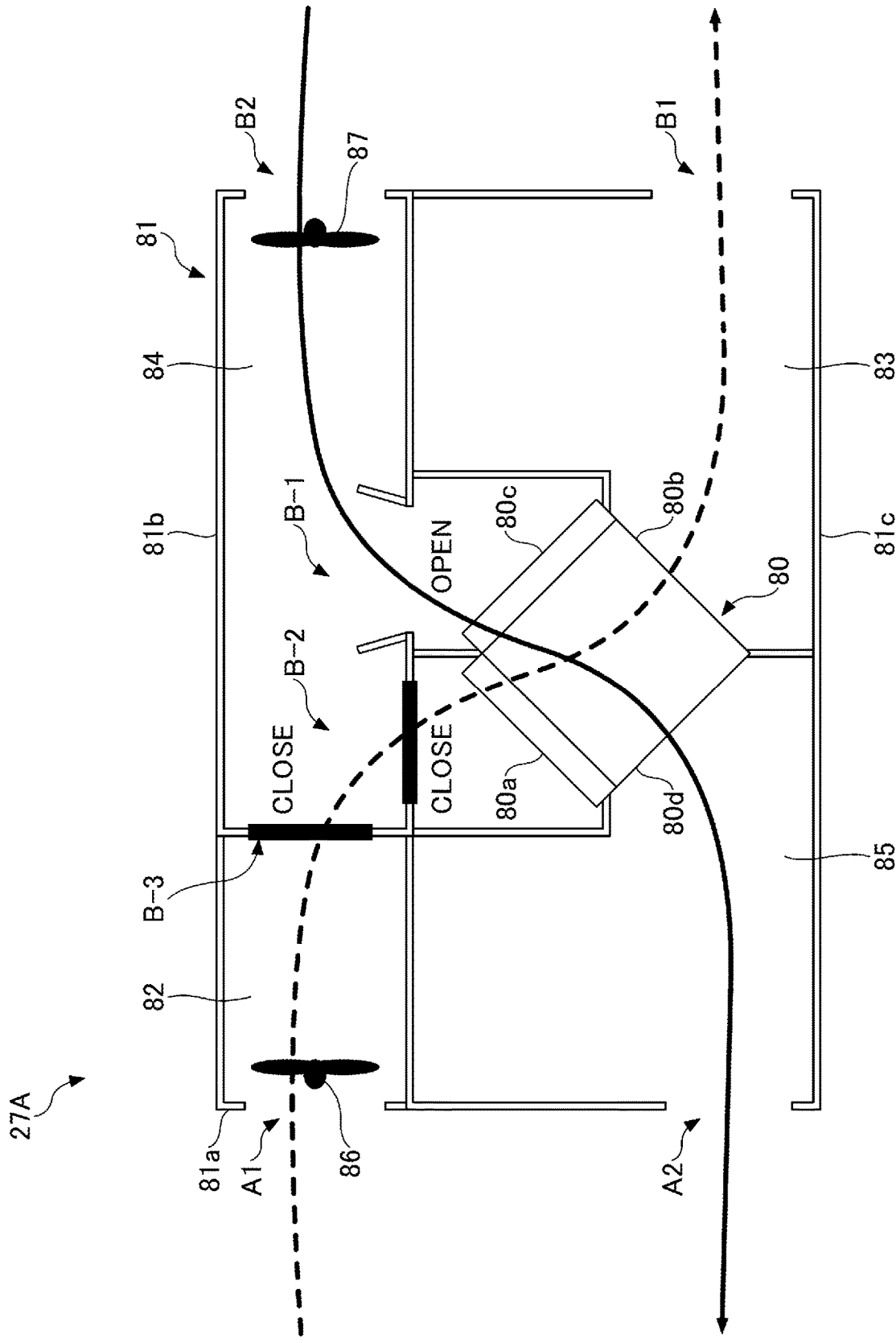
FIG. 9 is a cross-sectional side view illustrating the operating state of the first configuration example of the temperature adjustment apparatus in the third driving mode.

FIG. 8 is a cross-sectional top view illustrating an operating state of the first configuration example of the temperature adjustment apparatus in a third driving mode. FIG. 9 is a cross-sectional side view illustrating the operating state of the first configuration example of the temperature adjustment apparatus in the third driving mode.

The controller 17 controls the temperature adjustment apparatus 27A in the third driving mode of flowing air between the storage chamber 1 and the storage chamber 2 while inhibiting transfer of heat therebetween. In the third driving mode, the controller 17 actuates the air blowers 86 and 87, closes the openable/closable windows A-2, A-3, B-2, and B-3, and opens the openable/closable windows A-1 and B-1. Hence, air from the storage chamber 1 is supplied into the storage chamber 2 through a route of from the opening A1, to the internal chamber 82, to the openable/closable window A-1, to the element surface 80a, to the element surface 80b, to the internal chamber 83, and to the opening B1. On the other hand, air from the storage chamber 2 is supplied into the storage chamber 1 through a route of from the opening B2, to the internal chamber 84, to the openable/closable window B-1, to the element surface 80c, to the element surface 80d, to the internal chamber 85, and to the opening A2. By this control, it is possible to cause heat to be exchanged between the storage chamber 1 and the storage chamber 2 by flowing air therebetween by making air go through the heat exchange element 80. Hence, it is possible to circulate air between the storage chamber 1 and the storage chamber 2 while inhibiting temperature changes in each of the storage chamber 1 and the storage chamber 2.

Figure 10:
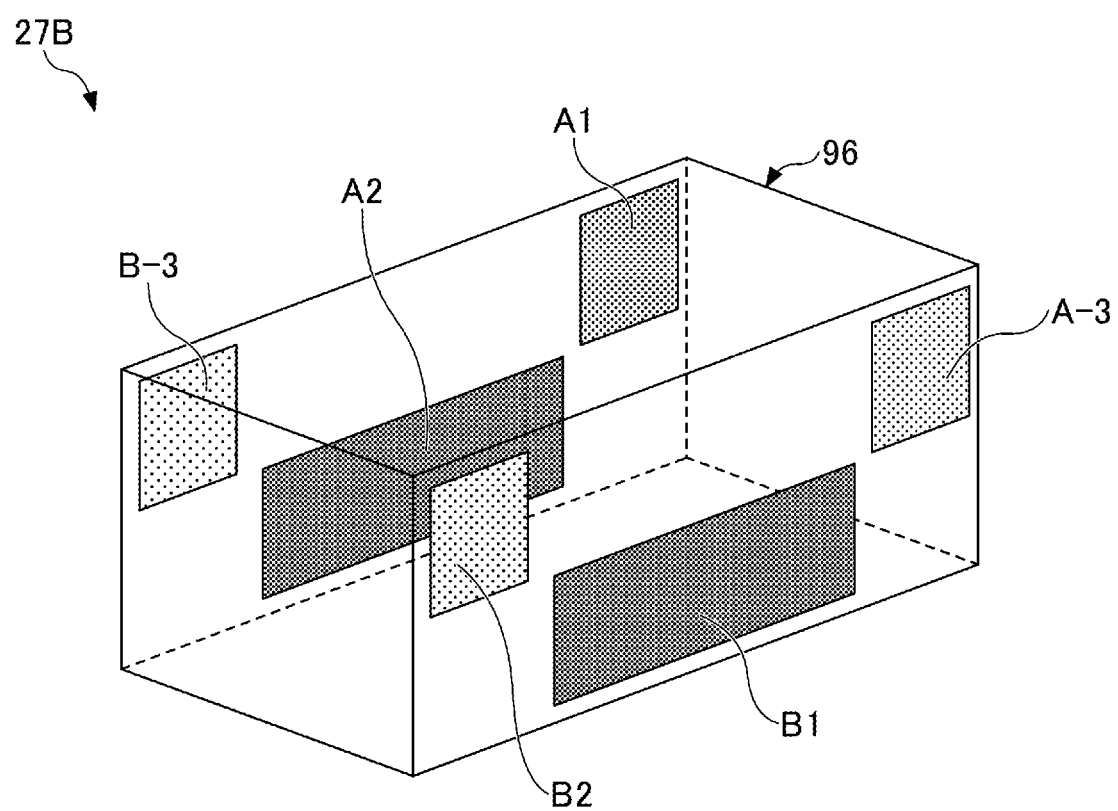
FIG. 10 is an oblique view illustrating a second configuration example of the temperature adjustment apparatus.

FIG. 10 is an oblique view illustrating a second configuration example of the temperature adjustment apparatus. A temperature adjustment apparatus 27B is an example of the temperature adjustment apparatus 27 described above, and has a size smaller than that of the temperature adjustment apparatus 27A. The temperature adjustment apparatus 27B includes an approximately rectangular parallelepiped-shaped casing 96 in which a heat exchange element 80 (not illustrated in FIG. 10) is contained. An opening A1, an opening B1, an opening B2, an opening A2, an openable/closable window A-3, and an openable/closable window B-3 are provided in the surfaces of the casing 96.

The opening A1, the opening A2, and the openable/closable window B-3 are provided in one surface of a pair of facing surfaces of the casing 96, and the opening B2, the opening B1, and the openable/closable window A-3 are provided in the other surface. The opening A1, the opening A2, and the openable/closable window B-3 are coupled to the storage chamber 1, and the opening B2, the opening B1, and the openable/closable window A-3 are coupled to the storage chamber 2.

Figure 11:
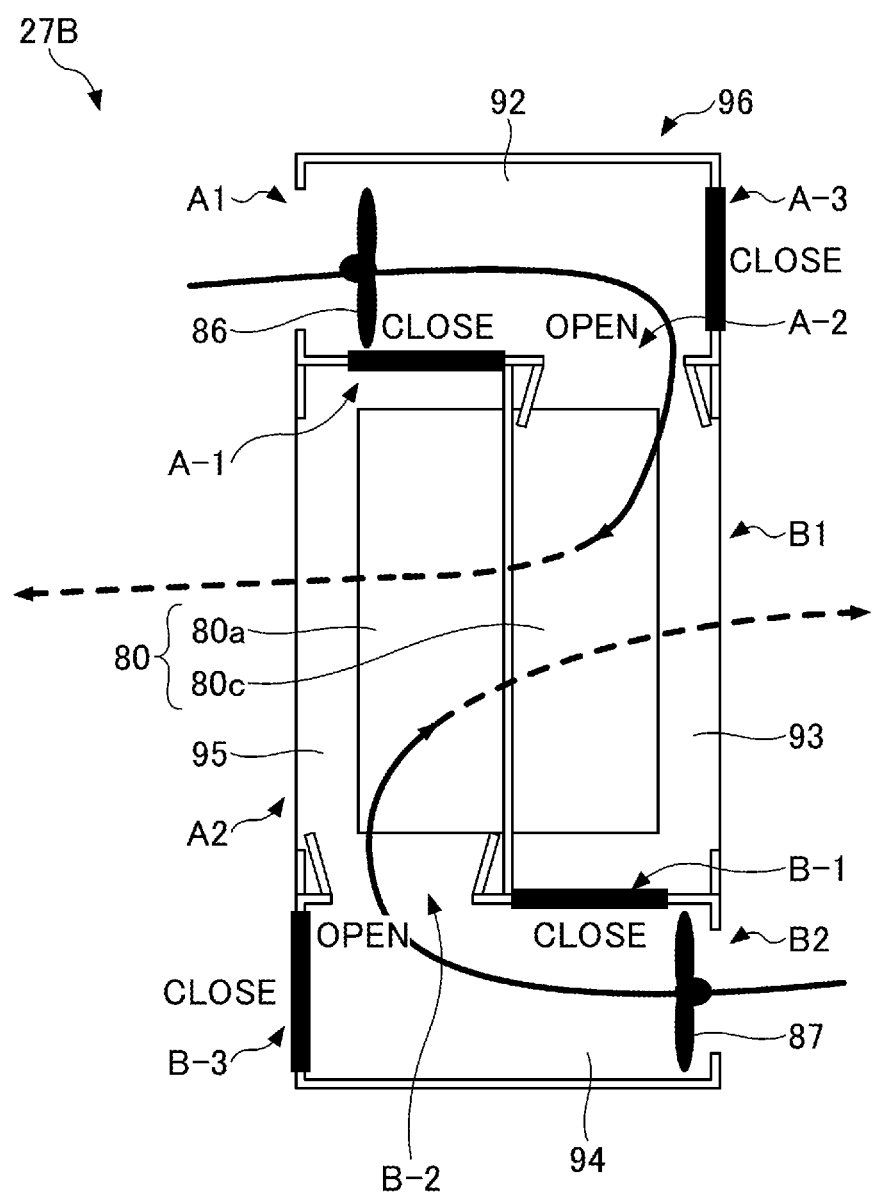
FIG. 11 is a cross-sectional top view illustrating an operating state of the second configuration example of the temperature adjustment apparatus in the first driving mode.
Figure 12:
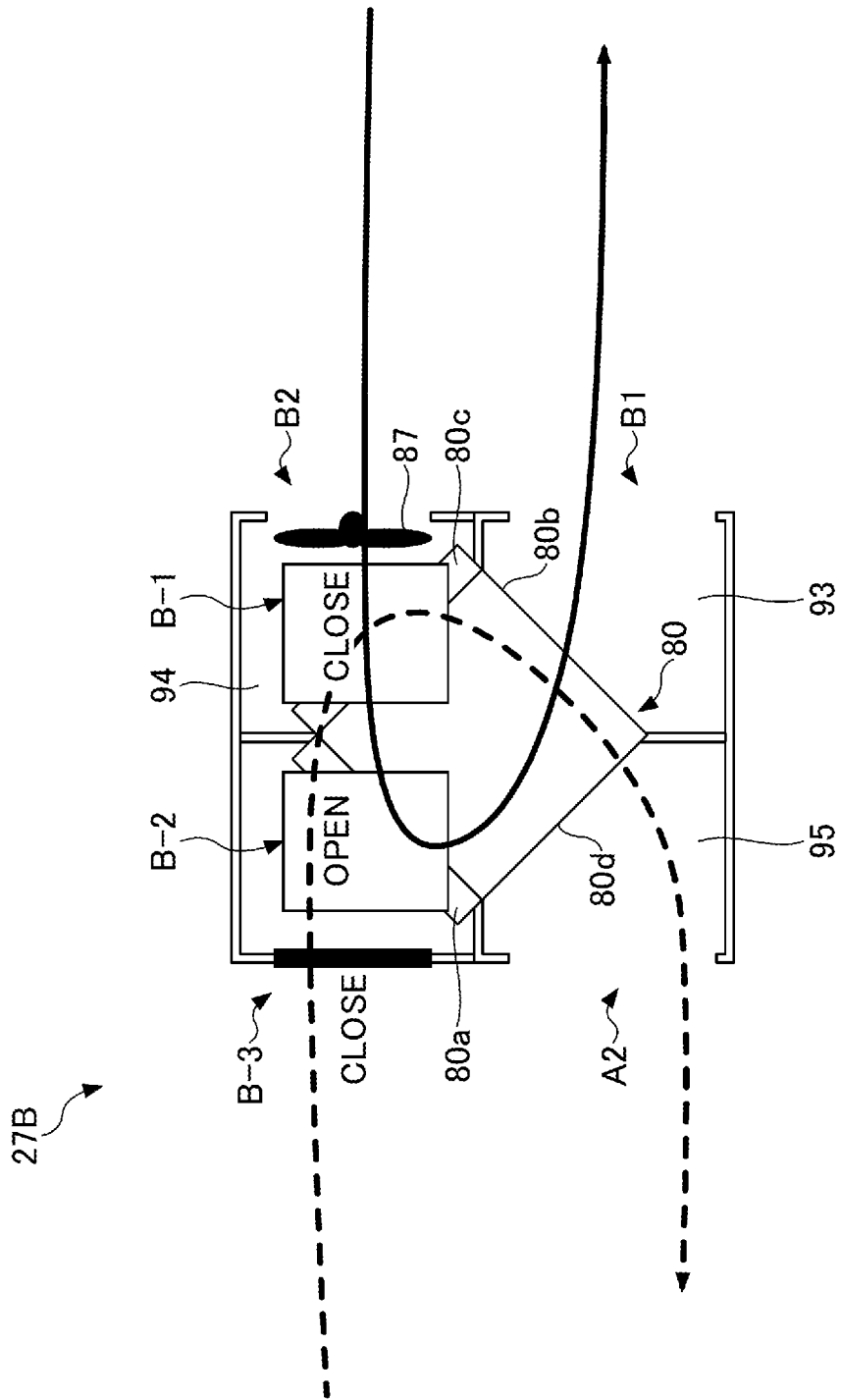
FIG. 12 is a cross-sectional side view illustrating the operating state of the second configuration example of the temperature adjustment apparatus in the first driving mode.

FIG. 11 is a cross-sectional top view illustrating an operating state of the second configuration example of the temperature adjustment apparatus in the first driving mode. FIG. 12 is a cross-sectional side view illustrating the operating state of the second configuration example of the temperature adjustment apparatus in the first driving mode. An internal chamber 92, an internal chamber 93, an internal chamber 94, and an internal chamber 95 are formed in the internal space of the casing 96. The internal chamber 92, the internal chamber 93, the internal chamber 94, and the internal chamber 95 are partitioned from adjoining chambers by partition walls. In the second configuration example, the openings A1 and B2 are used as air suction openings, the openings A2 and B1 are used as blowout openings, the internal chambers 92 and 94 are used as air suction chambers, and the internal chambers 93 and 95 are used as blowout chambers.

One end of the internal chamber 92 is coupled to the opening A1, and the other end thereof is coupled to the openable/closable window A-3. One end of the internal chamber 93 is coupled to an element surface 80b of the heat exchange element 80, and the other end thereof is coupled to the opening B1. One end of the internal chamber 94 is coupled to the opening B2, and the other end thereof is coupled to the openable/closable window B-3. One end of the internal chamber 95 is coupled to an element surface 80d of the heat exchange element 80, and the other end thereof is coupled to the opening A2.

Flowing and shut-off of air between the internal chamber 92 and the element surface 80a are controlled by opening or closing of an openable/closable window A-1. Flowing and shut-off of air between the internal chamber 82 and the element surface 80c are controlled by opening or closing of an openable/closable window A-2. Flowing and shut-off of air between the internal chamber 94 and the element surface 80c are controlled by opening or closing of an openable/closable window B-1. Flowing and shut-off between the internal chamber 94 and the element surface 80a are controlled by opening or closing of an openable/closable window B-2.

The controller 17 controls the temperature adjustment apparatus 27B in the first driving mode of causing heat to be exchanged between the storage chamber 1 and the storage chamber 2 without flowing air therebetween. In the first driving mode, the controller 17 actuates air blowers 86 and 87, closes the openable/closable windows A-1, B-1, A-3, and B-3, and opens the openable/closable windows A-2 and B-2. Hence, air from the storage chamber 1 is returned into the storage chamber 1 through a route of from the opening A1 to the internal chamber 92, to the openable/closable window A-2, to the element surface 80c, to the element surface 80d, to the internal chamber 95, and to the opening A2. On the other hand, air from the storage chamber 2 is returned into the storage chamber 2 through a route of from the opening B2 to the internal chamber 94, to the openable/closable window B-2, to the element surface 80a, to the element surface 80b, to the internal chamber 93, and to the opening B1. Hence, because heat is exchanged between the storage chamber 1 and the storage chamber 2 without flowing of air therebetween, it is possible to inhibit dew condensation in the storage chamber 1 that is at the lower temperature of the storage chamber 1 and the storage chamber 2.

Hence, like the temperature adjustment apparatus 27A, the temperature adjustment apparatus 27B can be driven in the first driving mode. Like the temperature adjustment apparatus 27A, the temperature adjustment apparatus 27B can be driven in the second driving mode and the third driving mode. The foregoing descriptions about the temperature adjustment apparatus 27A are cited as detailed descriptions of these modes.

Figure 13:
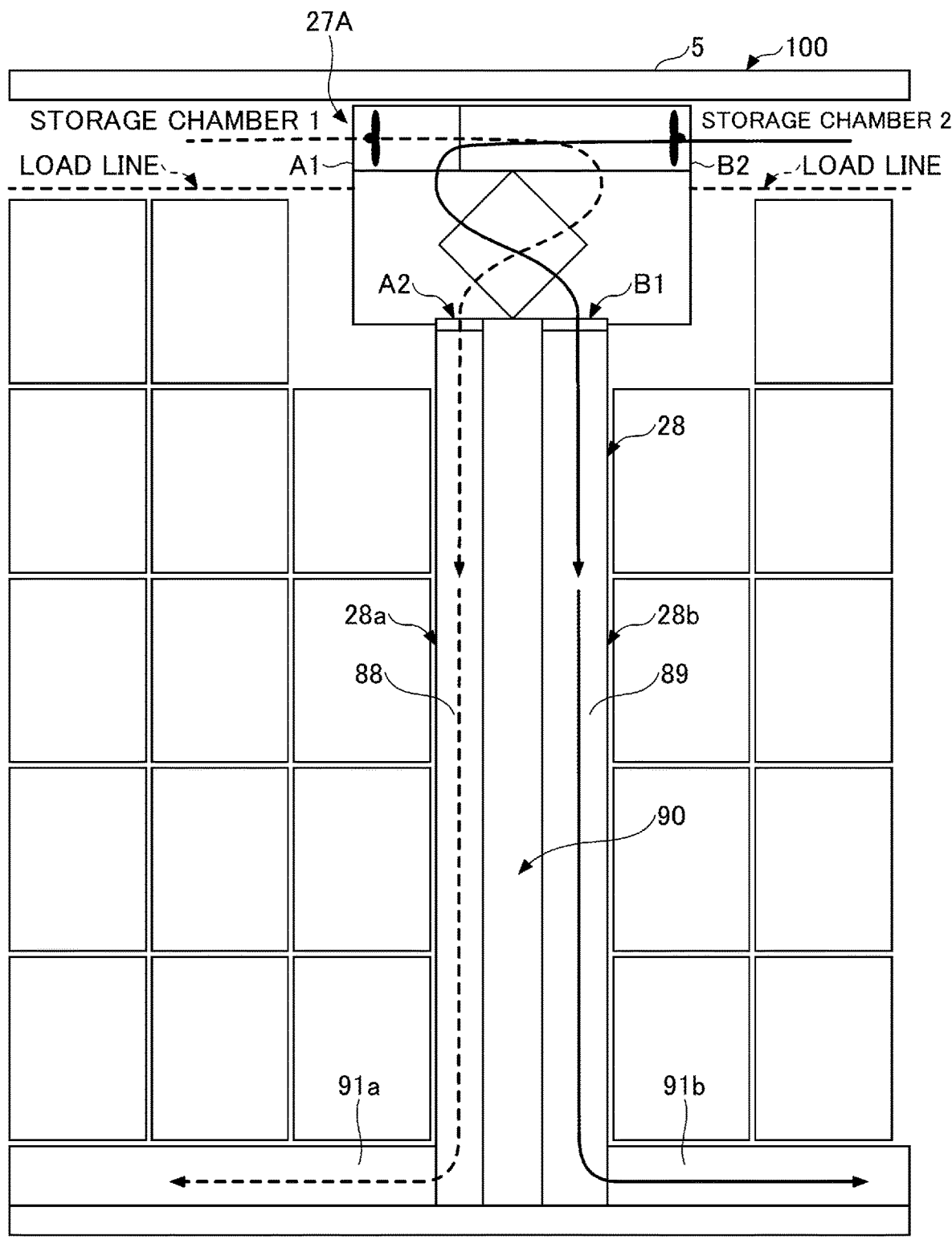
FIG. 13 is a cross-sectional side view illustrating venting passages through which air is flowed from a storage upper portion to a storage bottom portion.

FIG. 13 is a cross-sectional side view illustrating venting passages through which air is flowed from a storage upper portion to a storage bottom portion. The temperature adjustment apparatus 27A is provided on top of the partition wall 28. The partition wall 28 includes a heat-insulating material 90, and venting passages 88 and 89. The heat-insulating material 90 is a core material that inhibits transfer of heat between the storage chamber 1 and the storage chamber 2 via the partition wall 28. The partition wall 28 has a partition surface 28a, which is a wall surface facing the storage chamber 1, and a partition surface 28b, which is a wall surface facing the storage chamber 2. The venting passage 88 is a flow path that is provided between the partition surface 28a and the heat-insulating material 90, and through which air is flowed along the partition surface 28a. The venting passage 89 is a flow path that is provided between the partition surface 28b and the heat-insulating material 90, and through which air is flowed along the partition surface 28b.

Air blown out from the opening A2 of the temperature adjustment apparatus 27A flows into the venting passage 88 from the upper end of the venting passage 88, and flows out from the lower end of the venting passage 88 to a bottom flow path 91a. The bottom flow path 91a is a flow path provided on the floor of the storage chamber 1. Air blown out from the opening B1 of the temperature adjustment apparatus 27A flows into the venting passage 89 from the upper end of the venting passage 89, and flows out from the lower end of the venting passage 89 to a bottom flow path 91b. The bottom flow path 91b is a flow path provided on the floor of the storage chamber 2. The bottom flow paths 91a and 91b are air flow paths provided on the bottom of the storage 100, and are, for example, T letter-shaped T-rail portions, drainboard portions, or pallet portions. The temperature adjustment apparatus 27A illustrated in FIG. 13 is only different from the configuration illustrated in FIG. 5 in the positions of the openings A2 and B1.

The opening A1 is open to an upper space of the storage chamber 1 such that it can suction air that is in the upper space of the storage chamber 1. The upper space of the storage chamber 1 is, for example, a space above a load line of the storage chamber 1. The opening B2 is open to an upper space of the storage chamber 2 such that it can suction air that is in the upper space of the storage chamber 2. The upper space of the storage chamber 2 is, for example, a space above a load line of the storage chamber 2. A load line is the maximum height until which articles can be stored.

The venting passage 88 can circulate air that is in the bottom flow path 91a provided on the bottom of the storage 100 and air that is in the storage upper portion above the load line of the storage chamber 1 into each other. Hence, it is possible to inhibit the temperature in the storage chamber 1 from varying between the upper portion and the lower portion. The venting passage 89 can circulate air that is in the bottom flow path 91b provided on the bottom of the storage 100 and air that is in the storage upper portion above the load line of the storage chamber 2 into each other. Hence, it is possible to inhibit the temperature in the storage chamber 2 from varying between the upper portion and the lower portion.

Figure 14:
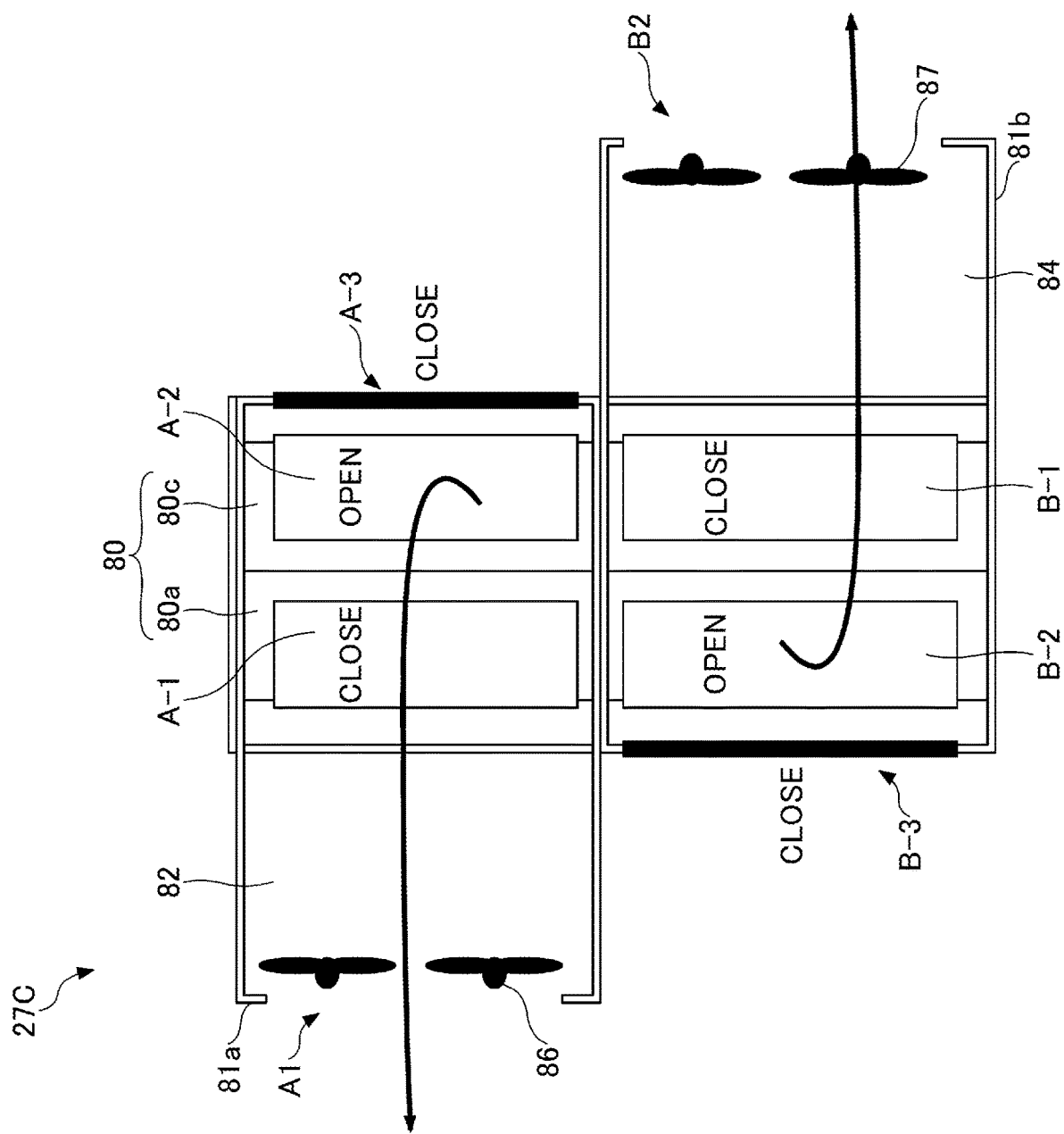
FIG. 14 is a cross-sectional top view illustrating an operating state of a third configuration example of the temperature adjustment apparatus in the first driving mode.
Figure 15:
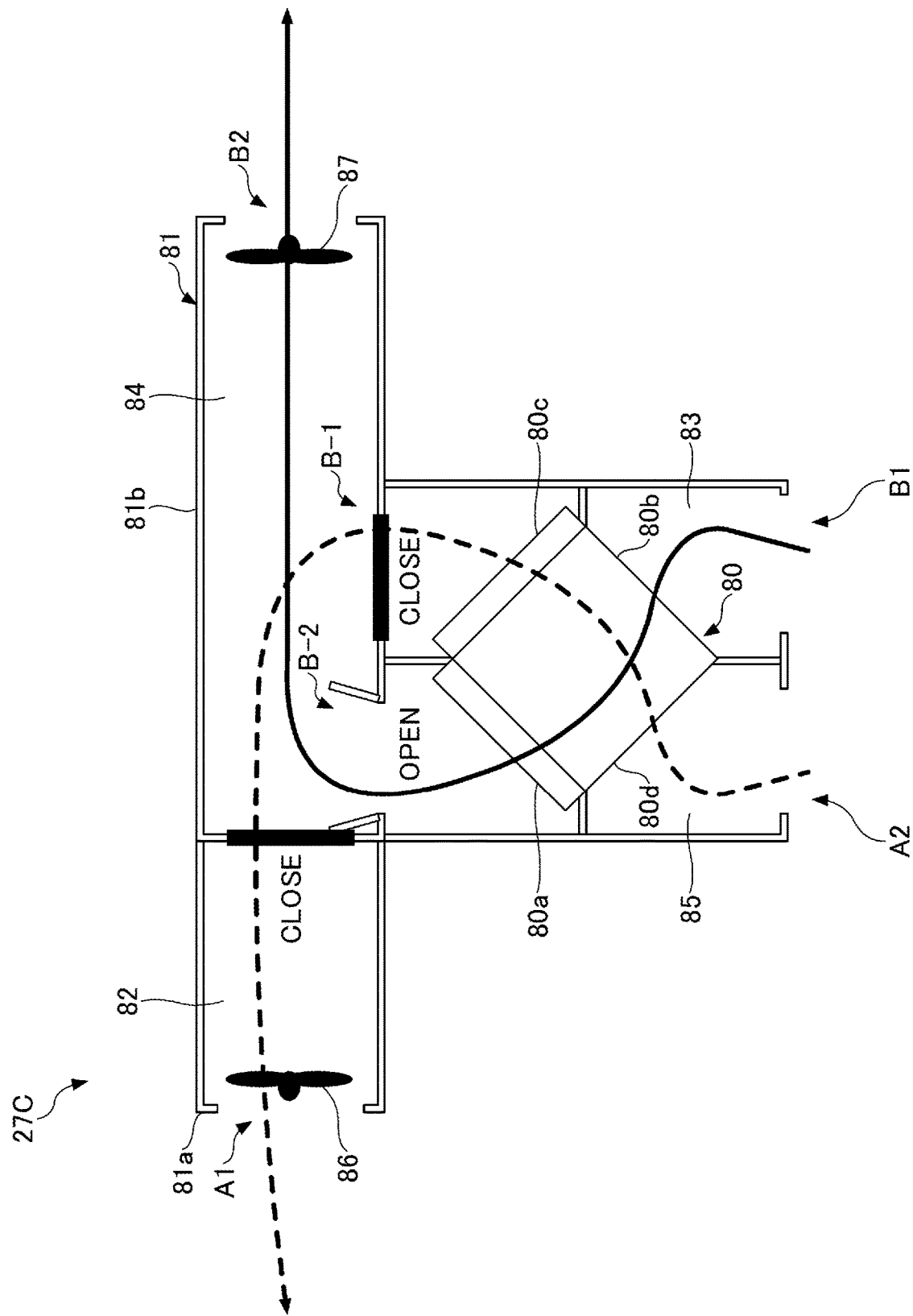
FIG. 15 is a cross-sectional side view illustrating the operating state of the third configuration example of the temperature adjustment apparatus in the first driving mode.

FIG. 14 is a cross-sectional top view illustrating an operating state of a third configuration example of the temperature adjustment apparatus in the first driving mode. FIG. 15 is a cross-sectional side view illustrating the operating state of the third configuration example of the temperature adjustment apparatus in the first driving mode. A temperature adjustment apparatus 27C illustrated in FIGS. 14 and 15 is a modified example of the temperature adjustment apparatus 27A described above. The temperature adjustment apparatus 27C has a structure configured to suction air from a lower side, and blow out air from a lateral side. Descriptions about any configurational particulars of the third configuration example that are the same as those of the configurational example described above are omitted by citing the foregoing descriptions.

The controller 17 controls the temperature adjustment apparatus 27C in the first driving mode of causing heat to be exchanged between the storage chamber 1 and the storage chamber 2 without flowing air therebetween. In the first driving mode of the third configuration example, openings A1 and B2 are used as blowout openings, openings A2 and B1 are used as air suction openings, internal chambers 82 and 84 are used as blowout chambers, and internal chambers 83 and 85 are used as air suction chambers. That is, the relationship between air suction and blowout in the first driving mode of the third configuration example is opposite from that in the first driving mode of the first configuration example. Hence, as illustrated in FIG. 15, air from the storage chamber 1 is returned into the storage chamber 1 through a route opposite from the route illustrated in FIG. 5, and air from the storage chamber 2 is returned into the storage chamber 2 through a route opposite from the route illustrated in FIG. 5. Hence, because heat is exchanged between the storage chamber 1 and the storage chamber 2 without flowing of air therebetween, it is possible to inhibit dew condensation in the storage chamber 1 that is at the lower temperature of the storage chamber 1 and the storage chamber 2.

Figure 16:
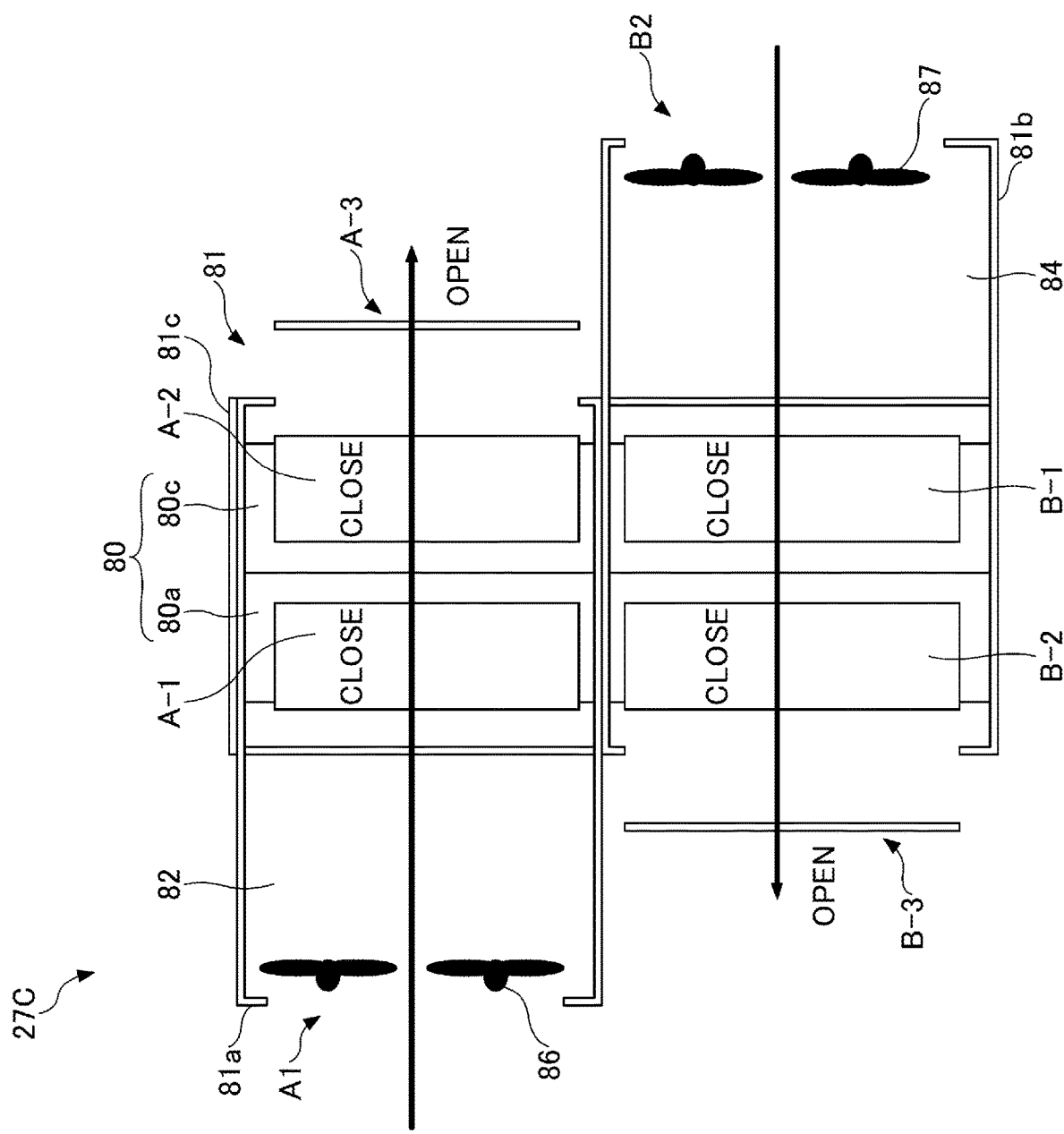
FIG. 16 is a cross-sectional top view illustrating an operating state of the third configuration example of the temperature adjustment apparatus in the second driving mode.
Figure 17:
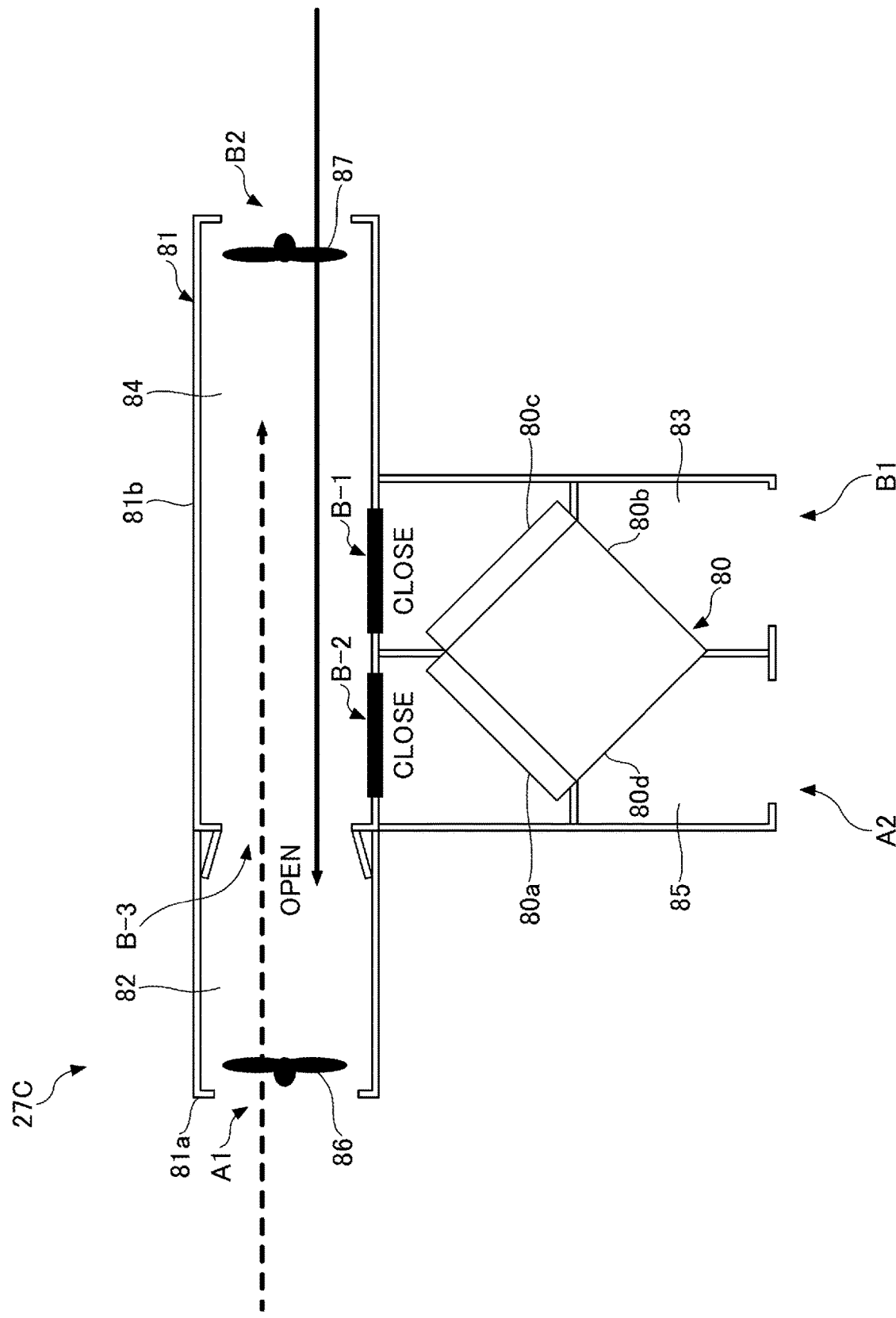
FIG. 17 is a cross-sectional side view illustrating the operating state of the third configuration example of the temperature adjustment apparatus in the second driving mode.

FIG. 16 is a cross-sectional top view illustrating an operating state of the third configuration example of the temperature adjustment apparatus in the second driving mode. FIG. 17 is a cross-sectional side view illustrating the operating state of the third configuration example of the temperature adjustment apparatus in the second driving mode.

The controller 17 controls the temperature adjustment apparatus 27C in the second driving mode of causing heat to be exchanged between the storage chamber 1 and the storage chamber 2 by flowing air therebetween. In the second driving mode of the third configuration example, the openings A1 and B2 are used as air suction openings, and the internal chambers 82 and 84 are used as air suction chambers. That is, the relationship between air suction and blowout in the second driving mode of the third configuration example is the same as that in the second driving mode of the first configuration example. Hence, it is possible to cause heat to be exchanged between the storage chamber 1 and the storage chamber 2 by flowing air therebetween by making air bypass the heat exchange element 80.

Figure 18:
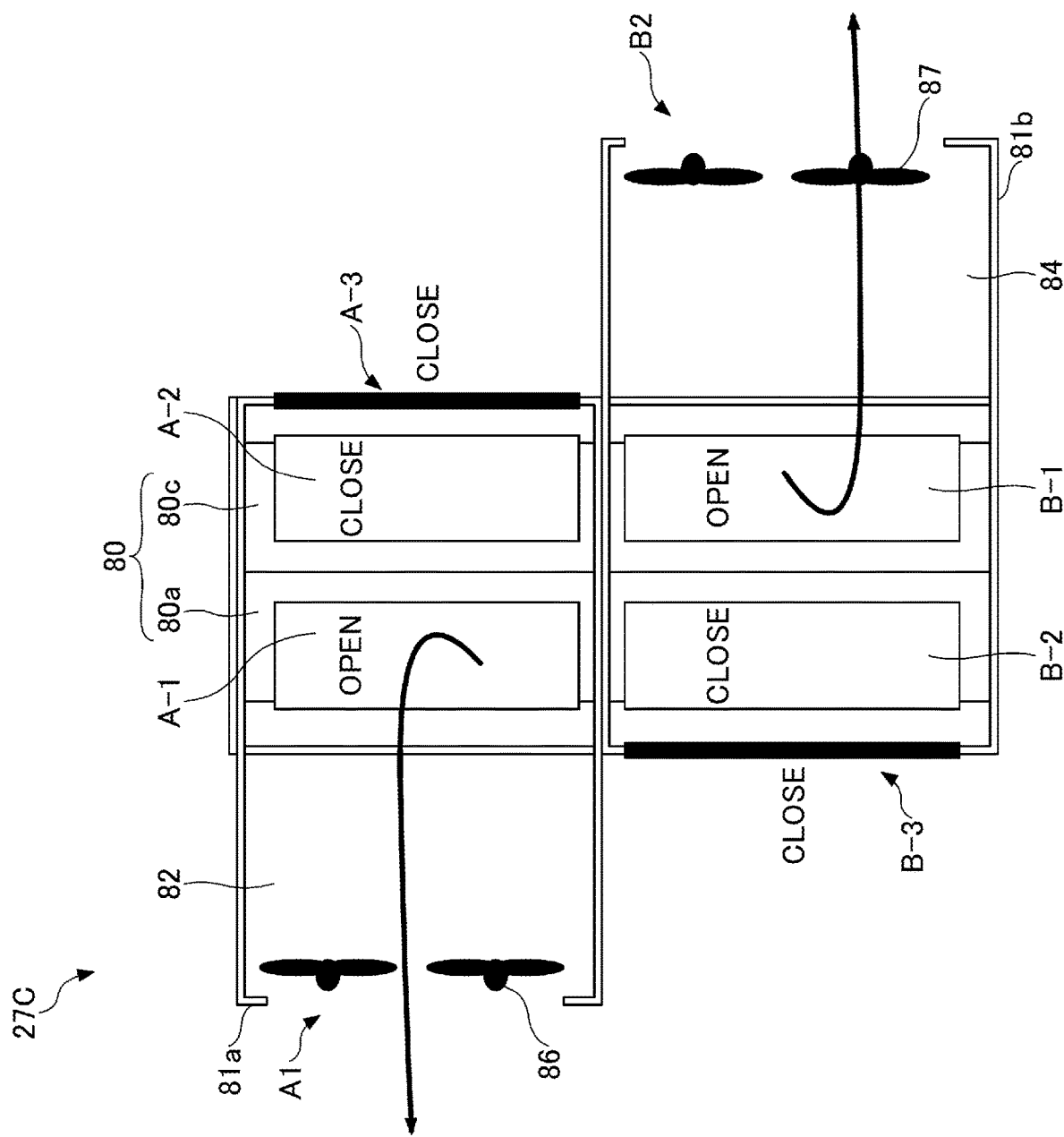
FIG. 18 is a cross-sectional top view illustrating an operating state of the third configuration example of the temperature adjustment apparatus in the third driving mode.
Figure 19:
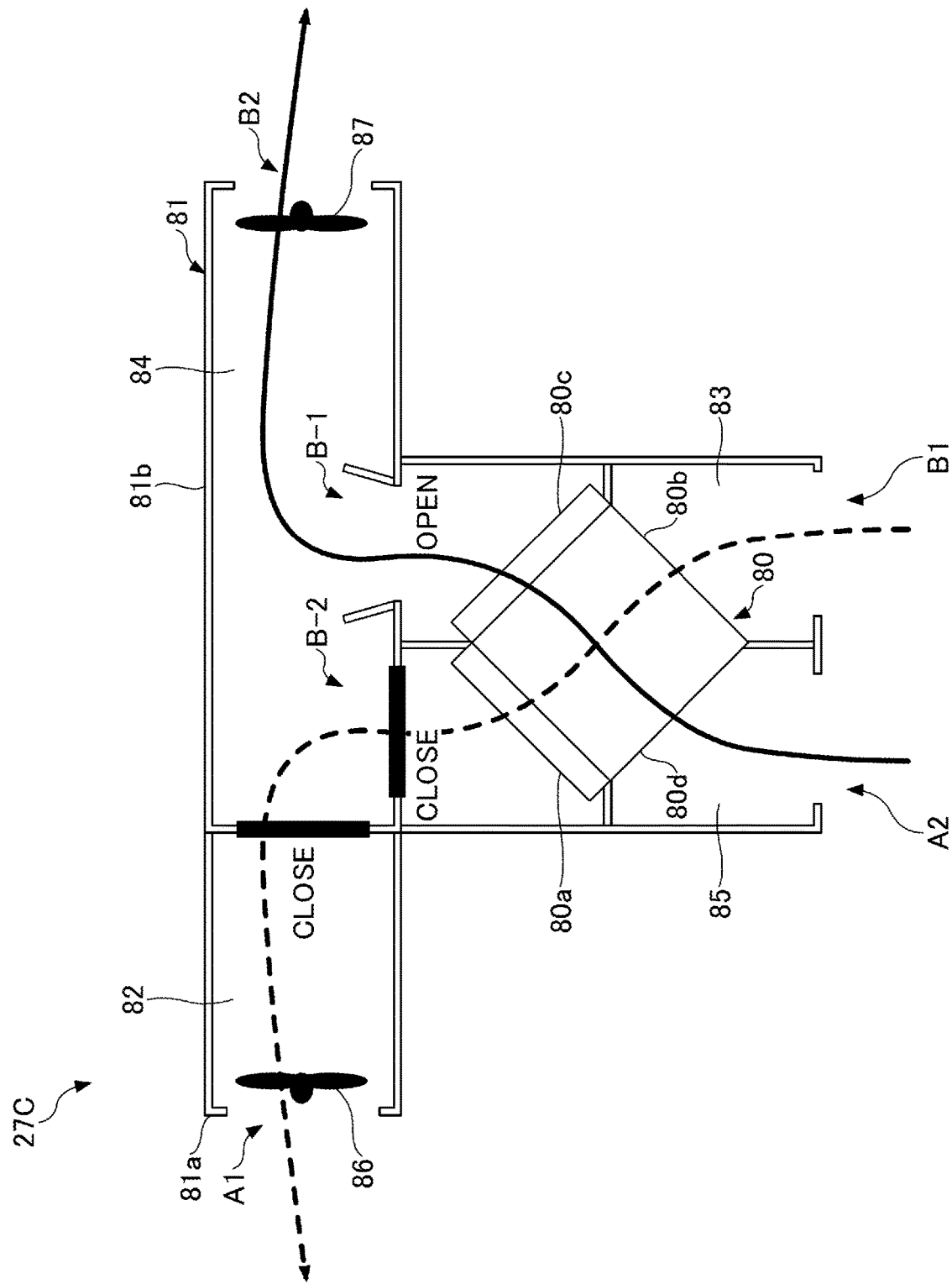
FIG. 19 is a cross-sectional side view illustrating the operating state of the third configuration example of the temperature adjustment apparatus in the third driving mode.

FIG. 18 is a cross-sectional top view illustrating an operating state of the third configuration example of the temperature adjustment apparatus in the third driving mode. FIG. 19 is a cross-sectional side view illustrating the operating state of the third configuration example of the temperature adjustment apparatus in the third driving mode.

The controller 17 controls the temperature adjustment apparatus 27C in the third driving mode of flowing air between the storage chamber 1 and the storage chamber 2 while inhibiting transfer of heat therebetween. In the third driving mode of the third configuration example, the openings A1 and B2 are used as blowout openings, the openings A2 and B1 are used as air suction openings, the internal chambers 82 and 84 are used as blowout chambers, and the internal chambers 83 and 85 are used as air suction chambers. That is, the relationship between air suction and blowout in the third driving mode of the third configuration example is opposite from that in the third driving mode of the first configuration example. Hence, as illustrated in FIG. 19, air from the storage chamber 1 is supplied into the storage chamber 2 through a route opposite from the route illustrated in FIG. 9, and air from the storage chamber 2 is supplied into the storage chamber 1 through a route opposite from the route illustrated in FIG. 9. Hence, it is possible to cause heat to be exchanged between the storage chamber 1 and the storage chamber 2 by flowing air therebetween by making air go through the heat exchange element 80.

Figure 20:
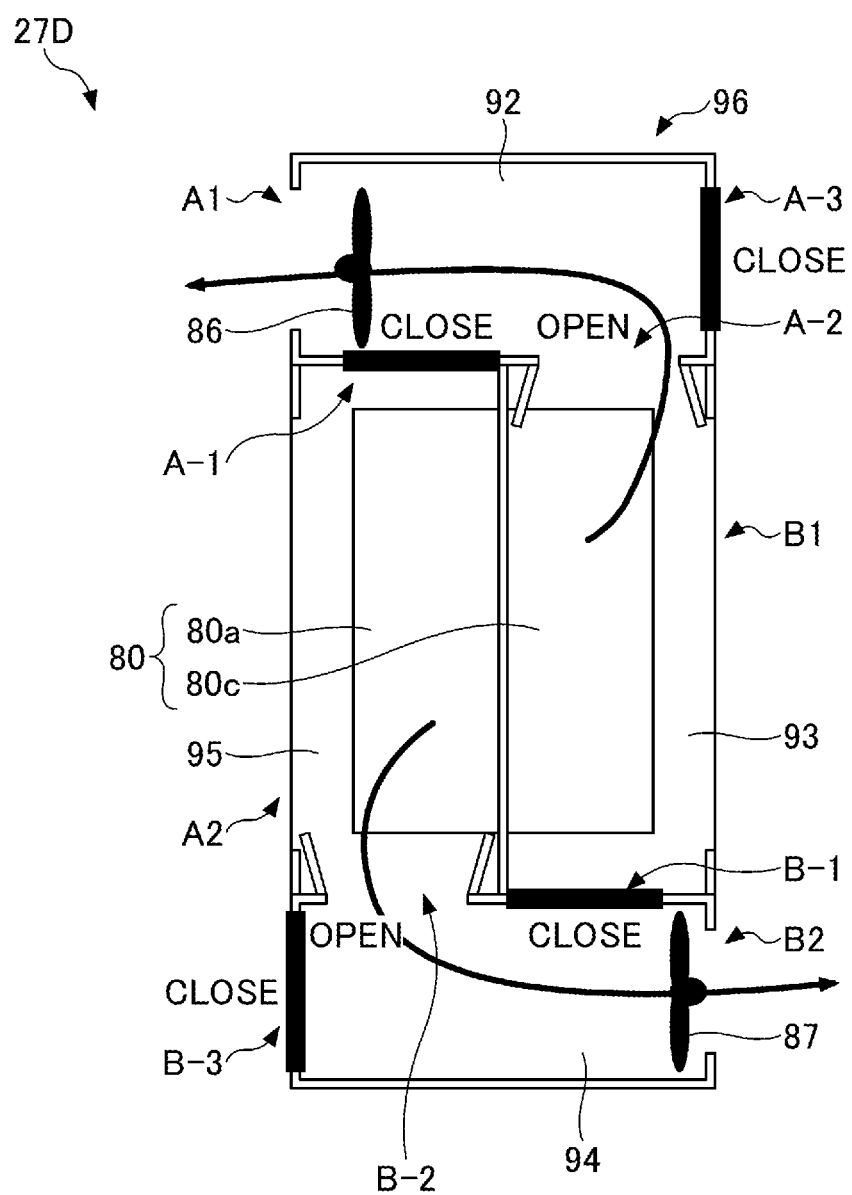
FIG. 20 is a cross-sectional top view illustrating an operating state of a fourth configuration example of the temperature adjustment apparatus in the first driving mode.
Figure 21:
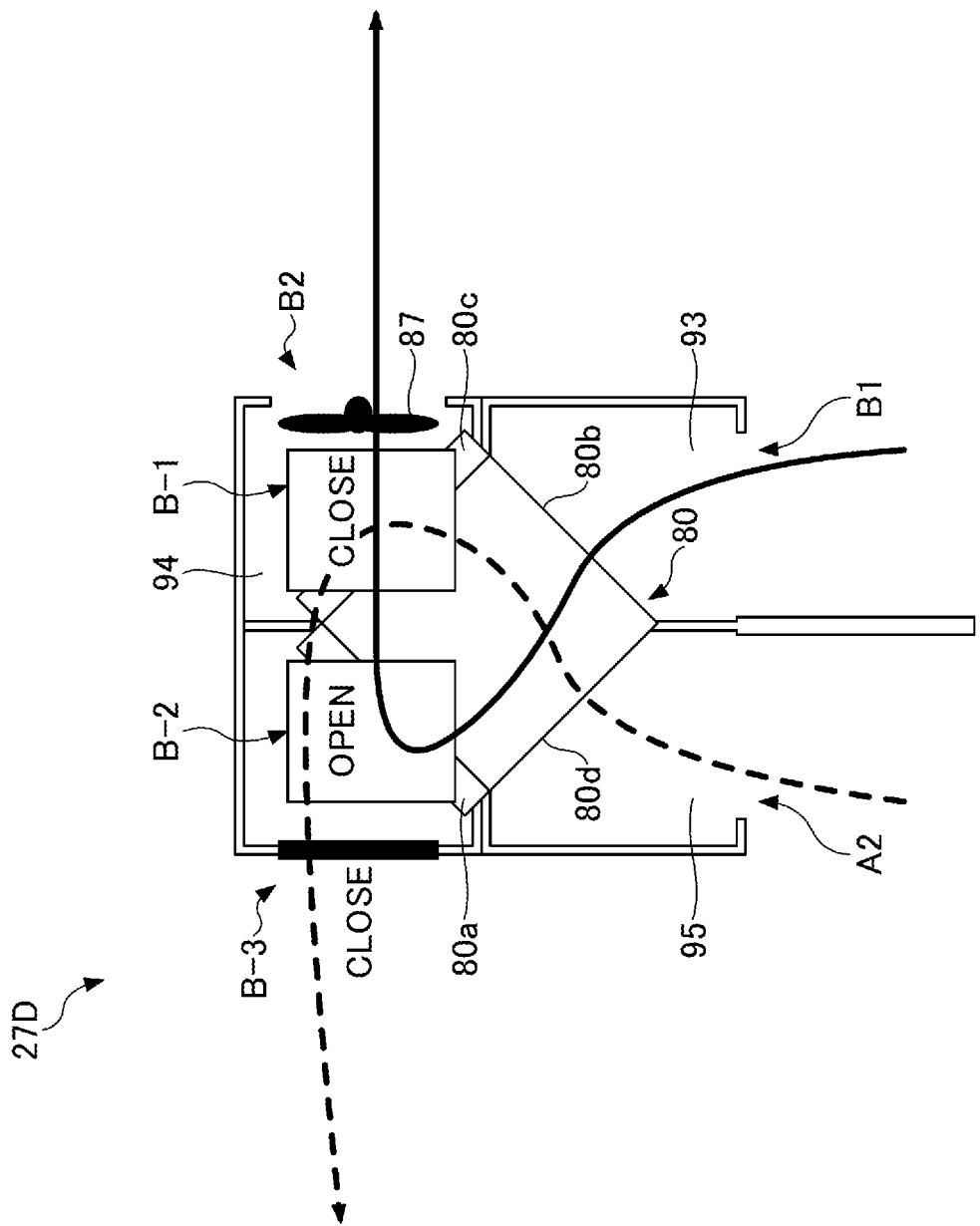
FIG. 21 is a cross-sectional side view illustrating the operating state of the fourth configuration example of the temperature adjustment apparatus in the first driving mode.

FIG. 20 is a cross-sectional top view illustrating an operating state of a fourth configuration example of the temperature adjustment apparatus in the first driving mode. FIG. 21 is a cross-sectional side view illustrating the operating state of the fourth configuration example of the temperature adjustment apparatus in the first driving mode. A temperature adjustment apparatus 27D illustrated in FIGS. 20 and 21 is a modified example of the temperature adjustment apparatus 27B described above. The temperature adjustment apparatus 27D has a structure configured to suction air from a lower side, and blow out air from a lateral side. Descriptions about any configurational particulars of the fourth configuration example that are the same as those of the configurational example described above are omitted by citing the foregoing descriptions.

The controller 17 controls the temperature adjustment apparatus 27D in the first driving mode of causing heat to be exchanged between the storage chamber 1 and the storage chamber 2 without flowing air therebetween. In the first driving mode of the fourth configuration example, openings A1 and B2 are used as blowout openings, openings A2 and B1 are used as air suction openings, internal chambers 82 and 84 are used as blowout chambers, and internal chambers 83 and 85 are used as air suction chambers. That is, the relationship between air suction and blowout in the first driving mode of the fourth configuration example is opposite from that in the first driving mode of the second configuration example. Hence, as illustrated in FIGS. 20 and 21, air from the storage chamber 1 is returned into the storage chamber 1 through a route opposite from the route illustrated in FIGS. 11 and 12, and air from the storage chamber 2 is returned into the storage chamber 2 through a route opposite from the route illustrated in FIGS. 11 and 12. Hence, because heat is exchanged between the storage chamber 1 and the storage chamber 2 without flowing of air therebetween, it is possible to inhibit dew condensation in the storage chamber 1 that is at the lower temperature of the storage chamber 1 and the storage chamber 2.

Hence, like the temperature adjustment apparatuses 27A, 27B, and 27C, the temperature adjustment apparatus 27D can be driven in the first driving mode. Like the temperature adjustment apparatuses 27A, 27B, and 27C, the temperature adjustment apparatus 27D can be driven in the second driving mode and the third driving mode. The foregoing descriptions about the temperature adjustment apparatuses 27A, 27B, and 27C are cited as detailed descriptions of these modes.

Figure 22:
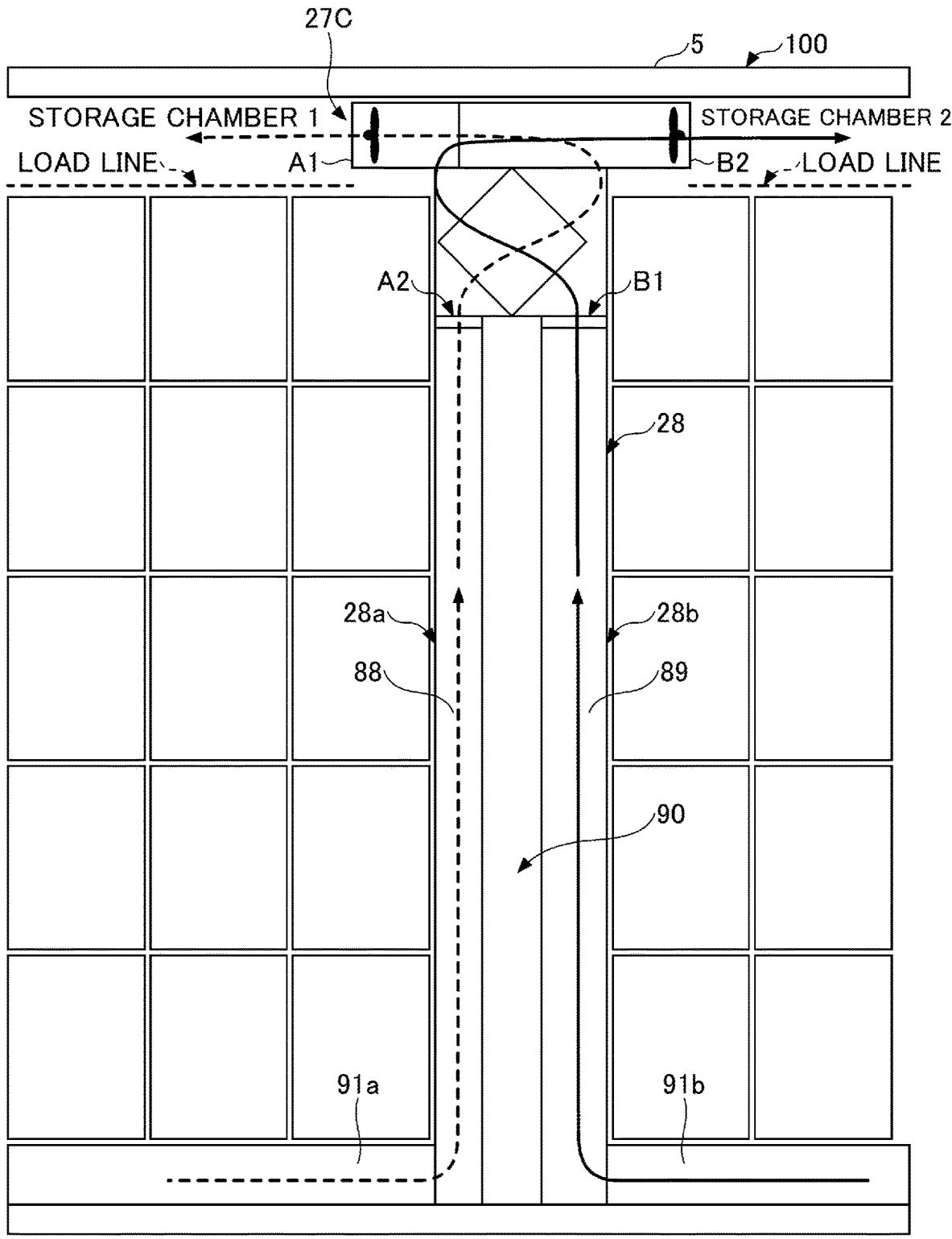
FIG. 22 is a cross-sectional side view illustrating venting passages through which air is flowed from a storage bottom portion to a storage upper portion.

FIG. 22 is a cross-sectional side view illustrating venting passages through which air is flowed from a storage bottom portion to a storage upper portion. The temperature adjustment apparatus 27C is provided on top of the partition wall 28. FIG. 22 is different from FIG. 13 in the direction in which air flows through the venting passages 88 and 89.

Air blown out from a bottom flow path 91a flows into the venting passage 88 from the lower end of the venting passage 88, and flows out from the upper end of the venting passage 88 to the opening A2 of the temperature adjustment apparatus 27C. Air blown out from a bottom flow path 91b flows into the venting passage 89 from the lower end of the venting passage 89, and flows out from the upper end of the venting passage 89 to the opening B1 of the temperature adjustment apparatus 27C. The opening A1 is open to an upper space of the storage chamber 1 such that it can blow out air to the upper space of the storage chamber 1. The opening B2 is open to an upper space of the storage chamber 2 such that it can blow out air to the upper space of the storage chamber 2.

Hence, the venting passages 88 and 89 can circulate air that is in the bottom portion of the storage and air that is in the upper portion of the storage into each other, as in the case of FIG. 13. Hence, it is possible to inhibit the temperature in the storage chamber from varying between the upper portion and the lower portion.

As illustrated in FIG. 2, the storage 100 may include an air composition adjustment apparatus 60 configured to adjust the composition of air in the storage chamber 1 or the storage chamber 2. This makes it possible to adjust the composition of air in the storage chamber 1 or the storage chamber 2. The controller 17 controls driving of the air composition adjustment apparatus 60. The air composition adjustment apparatus 60 forms an environment suited to Controlled Atmosphere (CA) storage in the storage chamber 1 or the storage chamber 2 by adjusting, for example, oxygen, carbon dioxide, nitrogen, temperature, and humidity. By CA storage, it is possible to store fresh food with a good freshness for a long term.

The temperature adjustment apparatus 27 may be driven in the first driving mode when the air composition adjustment apparatus 60 is adjusting the composition of air in the storage chamber 2. Hence, it is possible to inhibit an error from occurring in the adjustment of the composition of air in the storage chamber 2 due to air being flowed into the storage chamber 2 from the storage chamber 1. Particularly, it is possible to inhibit the storage chamber 2 from becoming an environment unsuited to CA storage due to cold air flowing into the storage chamber 2 from the storage chamber 1.

Next, a second embodiment will be described. In the second embodiment, descriptions about any configurational particulars that are the same as those of the first embodiment will be omitted by citing the foregoing descriptions.

Second Embodiment

Figure 23:
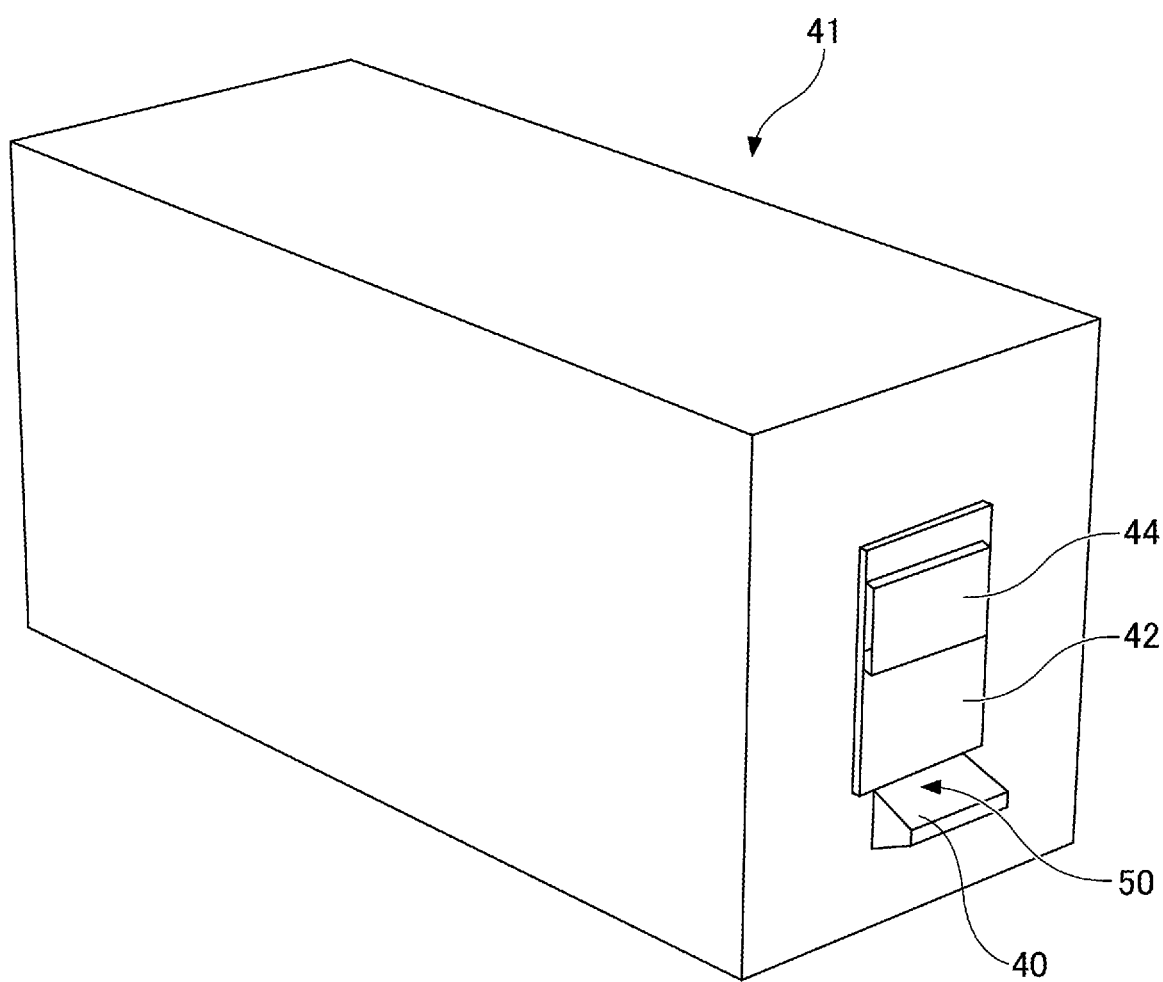
FIG. 23 is an oblique appearance view illustrating an example of a storage according to a second embodiment.

FIG. 23 is an appearance view illustrating an example of a storage according to the second embodiment. A storage 41 illustrated in FIG. 23 is realized by using, for example, a hauled freezing/refrigeration container, which is a transport container. The freezing/refrigeration container has a freezing/refrigeration function, and includes a storage region, which is an example of a temperature adjustment region utilizing the freezing/refrigeration function. The storage region is temperature-controlled by the freezing/refrigeration function. Qualities of articles stored in the storage 41 are maintained by the temperature control.

The storage 41 has a loading function of loading the storage region with articles, and an unloading function of unloading the storage region of the articles stored therein. The loading function and the unloading function can be realized by, for example, using an operation panel 40 and a receiving device 50. The operation panel 40 includes, for example, an operation receiving unit configured to receive an operation from a user, and an information output unit configured to display information for the user on a screen or output information for the user by sound. The operation receiving unit includes, for example, a physical button, a touch screen, or a sound inputting microphone configured to receive an operation from a user. The information output unit includes, for example, a display device and a loudspeaker. The receiving device 50 is configured to receive an article loading operation from a user or an article unloading operation from a user, which is received by the operation panel 40 from the user, and perform various controls.

The receiving device 50 has a window 42 for article loading or unloading. An article loaded on the window 42 by a user can be conveyed to the storage region by an automatic conveying apparatus. An article being stored in the storage region can be conveyed to the window 42 by the automatic conveying apparatus.

An openable/closable door 44 may be provided on the window 42. FIG. 23 represents a state in which the door 44 is open.

The storage 41 according to the second embodiment includes a controller 17, a freezing apparatus 10, a storage chamber 30, a partition wall 28, a freezing apparatus 10, and a temperature adjustment apparatus 27 as in FIG. 2. Hence, also in the second embodiment, it is possible to obtain the same effect as that of the first embodiment by having the same configuration as that of the first embodiment.

The embodiments have been described above. However, it will be understood that various modifications are applicable to the embodiments and particulars without departing from the spirit and scope of the claims. Various modifications and improvements such as combinations or replacement with some or all of other embodiments are possible.

This international application claims priority to Japanese Patent Application No. 2021-059438 filed Mar. 31, 2021. The entire contents of Japanese Patent Application No. 2021-059438 are incorporated herein by reference.

REFERENCE SIGNS LIST 1, 2: storage chamber
5: container
7: openable/closable door
10: freezing apparatus
17: controller
27, 27A, 27B, 27C, 27D: temperature adjustment apparatus
28: partition wall
28a, 28b: partition surface
30: storage chamber
41: storage
42: window
44: door
50: receiving device
60: air composition adjustment apparatus
80: heat exchange element
81, 96: casing
81a, 81b, 81c: casing portions
82, 83, 84, 85, 92, 93, 94, 95: internal chamber
86, 87: air blower
88, 89: venting passage
90: heat-insulating material
91a, 91b: bottom flow path
100: storage
A1, B2: opening
A2, B1: opening
A-3, B-3: openable/closable window
S: storage interior space

The invention claimed is:

1. A temperature adjustment apparatus configured to transfer heat in a first storage chamber to a second storage chamber, and adjust the first storage chamber and the second storage chamber to different temperatures, the temperature adjustment apparatus comprising:
a controller configured to perform control in a first driving mode of causing heat to be exchanged between the first storage chamber and the second storage chamber without flowing air therebetween,
wherein the controller is configured to perform control in a second driving mode of causing heat to be exchanged between the first storage chamber and the second storage chamber by flowing air therebetween without passing through a heat exchange element, and in a third driving mode of flowing air between the first storage chamber and the second storage chamber via the heat exchange element.

2. The temperature adjustment apparatus according to claim 1,
wherein the controller performs control in the second driving mode in response to a rise in a concentration of carbon dioxide or ethylene in the first storage chamber or the second storage chamber.

3. A storage, comprising:
the temperature adjustment apparatus of claim 1;
the first storage chamber in which an article is stored; and
the second storage chamber in which an article is stored.

4. The storage according to claim 3,
wherein the first storage chamber is for freezing, and the second storage chamber is for refrigeration.

5. The storage according to claim 3, comprising:
an air composition adjuster configured to adjust a composition of air in the first storage chamber or the second storage chamber.

6. The storage according to claim 5,
wherein the temperature adjustment apparatus is driven in the first driving mode when the air composition adjuster is adjusting the composition of air in the second storage chamber.

7. The storage according to claim 3, comprising:
a venting passage provided in a wall partitioning the first storage chamber and the second storage chamber,
wherein air that is in a T-rail portion, a drainboard portion, or a pallet portion on a storage bottom portion, and air that is in a storage upper portion above a load line circulate into each other through the venting passage.

* * * * *